United States Patent
Rose et al.

(10) Patent No.: US 11,595,327 B2
(45) Date of Patent: Feb. 28, 2023

(54) METHOD, APPARATUS, AND COMPUTER PROGRAM PRODUCT FOR ASSOCIATING AN IDENTIFIER WITH ONE OR MORE MESSAGE COMMUNICATIONS WITHIN A GROUP-BASED COMMUNICATION SYSTEM

(71) Applicant: Slack Technologies, LLC, San Francisco, CA (US)

(72) Inventors: Sean Rose, San Francisco, CA (US); Andreas Haugstrup Pedersen, San Francisco, CA (US); Daniel Stewart Butterfield, Vancouver (CA); Callum Henderson-Begg, San Francisco, CA (US); Christopher David Montrois, Redwood City, CA (US); Lauren Bosak Wagner, San Francisco, CA (US); Milo Watanabe, San Francisco, CA (US)

(73) Assignee: Salesforce, inc., San Francisco, CA (US)

( * ) Notice: Subject to any disclaimer, the term of this patent is extended or adjusted under 35 U.S.C. 154(b) by 387 days.

(21) Appl. No.: 15/782,678

(22) Filed: Oct. 12, 2017

(65) Prior Publication Data
US 2018/0212903 A1    Jul. 26, 2018

Related U.S. Application Data

(60) Provisional application No. 62/556,606, filed on Sep. 11, 2017, provisional application No. 62/408,670, filed on Oct. 14, 2016.

(51) Int. Cl.
*H04L 51/04* (2022.01)
*H04L 61/301* (2022.01)
(Continued)

(52) U.S. Cl.
CPC ............ *H04L 51/04* (2013.01); *G06F 16/951* (2019.01); *G06F 16/955* (2019.01);
(Continued)

(58) Field of Classification Search
CPC ..................................................... H04L 51/04
See application file for complete search history.

(56) References Cited

U.S. PATENT DOCUMENTS 7,730,094 B2    6/2010    Kaler et al.
8,874,558 B1    10/2014    He et al.
(Continued)

OTHER PUBLICATIONS

U.S. Appl. No. 62/554,952, filed Sep. 6, 2017, In re: Frank entitled Method, Apparatus, and Computer Program Product for Authorizing and Authenticating User Communication Within an Enterprise Group-Based Communication Platform.
(Continued)

*Primary Examiner* — Nicholas P Celani
(74) *Attorney, Agent, or Firm* — Holland & Hart LLP

(57) ABSTRACT

Embodiments of the present disclosure relate to a group-based communication server for associating an identifier with one or more message communications within a group-based communication system. In some embodiments, the group-based communication server comprises at least one processor and at least one memory including computer program code.

21 Claims, 11 Drawing Sheets

(51) Int. Cl.
  *G06F 16/951* (2019.01)
  *G06F 16/955* (2019.01)
  *H04L 12/18* (2006.01)
  *H04L 51/48* (2022.01)
  *H04L 61/5069* (2022.01)
  *H04L 101/365* (2022.01)

(52) U.S. Cl.
  CPC .......... *H04L 12/1822* (2013.01); *H04L 51/48* (2022.05); *H04L 61/301* (2013.01); *H04L 61/5069* (2022.05); *H04L 2101/365* (2022.05)

(56) References Cited

U.S. PATENT DOCUMENTS

| | | | |
|---|---|---|---|
| 2005/0289342 | A1 | 12/2005 | Needham et al. |
| 2006/0041661 | A1 | 2/2006 | Erikson et al. |
| 2008/0104172 | A1* | 5/2008 | Craig ................ H04L 67/38 709/204 |
| 2008/0104665 | A1 | 5/2008 | Naldurg et al. |
| 2008/0301766 | A1 | 12/2008 | Makino et al. |
| 2010/0030734 | A1 | 2/2010 | Chunilal |
| 2012/0030734 | A1 | 2/2012 | Wohlert |
| 2012/0054217 | A1 | 3/2012 | Clarke |
| 2012/0089698 | A1 | 4/2012 | Tseng |
| 2012/0240062 | A1 | 9/2012 | Passmore et al. |
| 2013/0073979 | A1 | 3/2013 | Shepherd et al. |
| 2013/0173578 | A1 | 7/2013 | Epstein |
| 2013/0297689 | A1 | 11/2013 | Bhat et al. |
| 2013/0332812 | A1 | 12/2013 | Houston |
| 2014/0025702 | A1* | 1/2014 | Curtiss .............. G06Q 30/02 707/769 |
| 2014/0052548 | A1 | 2/2014 | Dokken, Jr. |
| 2014/0122628 | A1* | 5/2014 | Yao ................ H04L 51/16 709/206 |
| 2014/0244834 | A1 | 8/2014 | Guedalia et al. |
| 2015/0135261 | A1 | 5/2015 | Park et al. |
| 2015/0261742 | A1* | 9/2015 | Gandhi .............. G06N 7/005 704/9 |
| 2015/0326522 | A1 | 11/2015 | Pu et al. |
| 2016/0019661 | A1 | 1/2016 | Bouganim et al. |
| 2016/0028673 | A1* | 1/2016 | Jeyaraman ........... G06Q 10/107 709/206 |
| 2016/0055160 | A1 | 2/2016 | Himel et al. |
| 2016/0080304 | A1* | 3/2016 | Hamlin .............. G06N 20/00 709/206 |
| 2016/0132344 | A1 | 5/2016 | Funk et al. |
| 2016/0191656 | A1* | 6/2016 | Nardone ............ H04L 67/306 709/206 |
| 2016/0203181 | A1 | 7/2016 | Verma et al. |
| 2016/0253427 | A1* | 9/2016 | Shen ................ G06F 3/0482 707/722 |
| 2016/0267544 | A1 | 9/2016 | Flood et al. |
| 2016/0285816 | A1 | 9/2016 | Schmid et al. |
| 2016/0323619 | A1 | 11/2016 | Lewis et al. |
| 2017/0201575 | A1* | 7/2017 | Song ................ H04L 51/16 |
| 2017/0250989 | A1 | 8/2017 | Bhattacharya et al. |
| 2017/0331828 | A1 | 11/2017 | Caldera et al. |
| 2017/0374001 | A1 | 12/2017 | Ifrim et al. |
| 2018/0287982 | A1 | 10/2018 | Draeger et al. |

OTHER PUBLICATIONS

Matsumoto, T. et al., "Chocoa Communicator—A New Communication System Based on Awareness and Text Communications—", Fujitsu Sci. Tech. J., 36, 2, (Dec. 2000) 154-161.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Robert Hof, "Stewart Butterfield On How Slack Became A $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, WIKIPEDIA, , [online][retrieved May 30, 2019]. Retrieved from the Internet: <URL https://en.wikipedia.org/wiki/Internet_Relay_Chat> (dated May 28, 2019) 17 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

\* cited by examiner

310

| 301<br>Global ID | 303<br>Full Name Value | 305<br>Preferred Name Value | 307<br>Group ID |
|---|---|---|---|
| W12345678 | Mary James | Mary | Security |
| | | | Mobile |
| W22222222 | Walter White | Walt | International Sales |
| W33333333 | David Le | Dave | Domestic Sales |
| W44444444 | 山田　太郎 | 太郎ちゃん | International Mobile |
| | | Taro-chan | |
| | Taro Yamada | Tar | |

501 Channel List Pane

Communication Channels
launch-reacji
announcements
things-to-know
marketing-team

503 Thread Summary Communication Pane

500 announcements

Matt: December 13th at 11:00 AM 736A
The Holiday Parade will take place on December 20th. Bring your families!

3 Replies 11:38 AM

Sam: 11:38 AM
Great! See you then @julie

Send a reply

☐ Share with #announcements

[Send]

things-to-know

Lucy: 9:03 AM
Daniel Wilson will join our team starting January 1st!

2 Replies 10:56 AM

Lucy: 10:56 AM
Added!

Send a reply

☐ Share with #things-to-know

[Send]

505 Thread Communication Pane

Matt: December 13th at 11:00 AM
In #announcements
The Holiday Parade will take place on December 20th. Bring your families!

Sam: 9:10 AM
Do you want to ride together to the parade?

Matt: 10:35 AM
Sure! Anna and I will stop by your house around 8.

Sam: 11:38 AM
Great! See you then @julie

Send a reply

☐ Share with #announcements

[Send]

[Unfollow]

FIG. 5

METHOD, APPARATUS, AND COMPUTER PROGRAM PRODUCT FOR ASSOCIATING AN IDENTIFIER WITH ONE OR MORE MESSAGE COMMUNICATIONS WITHIN A GROUP-BASED COMMUNICATION SYSTEM

CROSS REFERENCE TO RELATED APPLICATIONS

The present application claims priority to U.S. Provisional Application Ser. No. 62/556,606, titled "METHOD, APPARATUS, AND COMPUTER PROGRAM PRODUCT FOR ASSOCIATING AN IDENTIFIER WITH ONE OR MORE MESSAGE COMMUNICATIONS WITHIN A GROUP-BASED COMMUNICATION SYSTEM," filed Sep. 11, 2017, and to U.S. Provisional Application Ser. No. 62/408,670, titled "MESSAGING SEARCH AND MANAGEMENT APPARATUSES, METHODS AND SYSTEMS," filed Oct. 14, 2016, the contents of which are incorporated herein by reference in their entirety.

BACKGROUND

A communication system may support communication and collaboration among users. Such communications may be voluminous and difficult to organize which presents many complex technological, security, efficiency, and ease-of-use challenges. Applicant has identified a number of deficiencies and problems associated with such communication systems. Through applied effort, ingenuity, and innovation, many of these identified problems have been solved by developing solutions that are included in embodiments of the present disclosure, many examples of which are described in detail herein.

BRIEF SUMMARY

The disclosure relates to a group-based communication server for associating an identifier with one or more message communications within a group-based communication system.

In some embodiments, the group-based communication server comprises at least one processor and at least one memory including computer program code. In embodiments, the at least one memory and the computer program code are configured to, with at least one processor cause the group-based communication server to receive, from a client device, a message association request comprising a mention recipient identifier and a group-based communication channel identifier, wherein the message association request is associated with a message communication.

In some embodiments, the at least one memory and the computer program code are further configured to, with at least one processor cause the group-based communication server to determine, based on the received channel identifier, access control parameters of a group-based communication channel identified by the group-based communication channel identifier.

In some embodiments, the at least one memory and the computer program code are further configured to, with at least one processor cause the group-based communication server to determine, based on the access control parameters, an authorized user identifier list that indicates which users in the group-based communication system are authorized to access the identified group-based communication channel.

In some embodiments, the at least one memory and the computer program code are further configured to, with at least one processor cause the group-based communication server to determine a candidate user list based on a comparison between the mention recipient identifier and the authorized user identifier list.

In circumstances where the candidate user list comprises only one entry, the at least one memory and the computer program code are further configured to, with at least one processor cause the group-based communication server to retrieve a global identifier associated with the entry in the candidate user list, and associate the message communication with the global identifier.

In circumstances where the candidate user list comprises plurality of entries, the at least one memory and the computer program code are further configured to, with at least one processor cause the group-based communication server to retrieve a plurality of global identifiers associated with the plurality of entries in the candidate user list.

In some embodiments, the at least one memory and the computer program code are further configured to, with at least one processor cause the group-based communication server to determine detailed identifying information for each global identifier of the plurality of global identifiers. The at least one memory and the computer program code are optionally further configured to, with at least one processor cause the group-based communication server to transmit to the client device the detailed identifying information for each global identifier of the plurality of global identifiers.

In some embodiments, the at least one memory and the computer program code are further configured to, with at least one processor cause the group-based communication server to receive, from the client device, a selection of detailed identifying information associated with a global identifier. The at least one memory and the computer program code are optionally further configured to, with at least one processor cause the group-based communication server to associate the message communication with the global identifier.

In some embodiments, the mention recipient identifier is associated with a full name value or a display name value. In some embodiments, the detailed identifying information comprises a full name value and an avatar representation of a user associated with the global identifier. In some embodiments, the detail identifying information further comprises a display name value. In some embodiments, the detailed identifying information further comprises a user title value. In some embodiments, the global identifier uniquely identifies a user of the group-based communication system.

In some embodiments, the mention recipient identifier comprises one or more characters. In some embodiments, the authorized user identifier list comprises an array of entries, wherein each entry of the array of entries comprises a global identifier, a full name value, and a display name value.

In some embodiments, the at least one memory and the computer program code are optionally further configured to, with at least one processor cause the group-based communication server to Boolean comparing one or more characters in the mention recipient identifier to the full name value of each entry in the authorized user identifier list and adding to the candidate user list entries that return a Boolean value of true for at least an accuracy threshold percentage greater than 0.

In some embodiments, the at least one memory and the computer program code are optionally further configured to, with at least one processor cause the group-based communication server to compare each subsequent character in the mention recipient identifier to the full name value of each entry in the authorized user identifier list and add to the candidate user list entries that return a Boolean value of true for at least an accuracy threshold percentage greater than 0.

In some embodiments, the at least one memory and the computer program code are optionally further configured to, with at least one processor cause the group-based communication server to compare each subsequent character in the mention recipient identifier to the full name value of each entry in the authorized user identifier list, and add to the candidate user list entries that return a Boolean value of true for at least an accuracy threshold percentage of 100. In some embodiments, the accuracy threshold percentage is 80.

In some embodiments, the at least one memory and the computer program code are optionally further configured to, with at least one processor cause the group-based communication server to Boolean compare one or more characters in the mention recipient identifier to the display name value of each entry in the authorized user identifier list and add to the candidate user list entries that return a Boolean value of true for at least an accuracy threshold percentage greater than 0.

Popular some embodiments, the at least one memory and the computer program code are optionally further configured to, with at least one processor cause the group-based communication server to compare each subsequent character in the mention recipient identifier to the display name value of each entry in the authorized user identifier list, and add to the candidate user list entries that return a Boolean value of true for at least an accuracy threshold percentage greater than 0.

In some embodiments, the at least one memory and the computer program code are optionally further configured to, with at least one processor cause the group-based communication server to compare each subsequent character in the mention recipient identifier to the display name value of each entry in the authorized user identifier list, and add to the candidate user list entries that return a Boolean value of true for at least an accuracy threshold percentage of 100. In some embodiments, the accuracy threshold percentage is 80.

BRIEF DESCRIPTION OF THE DRAWINGS

Figure 1:
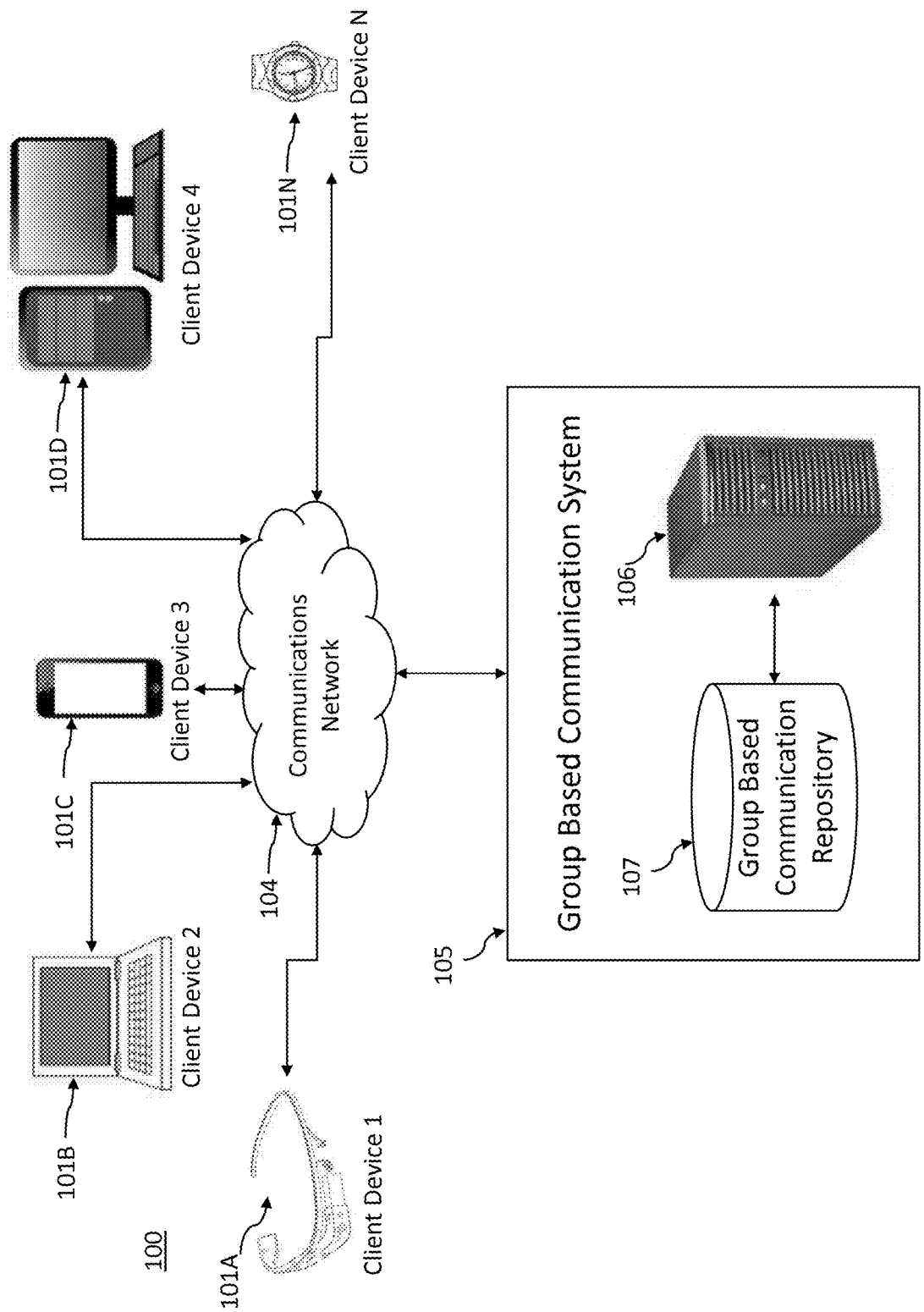
Figure 2:
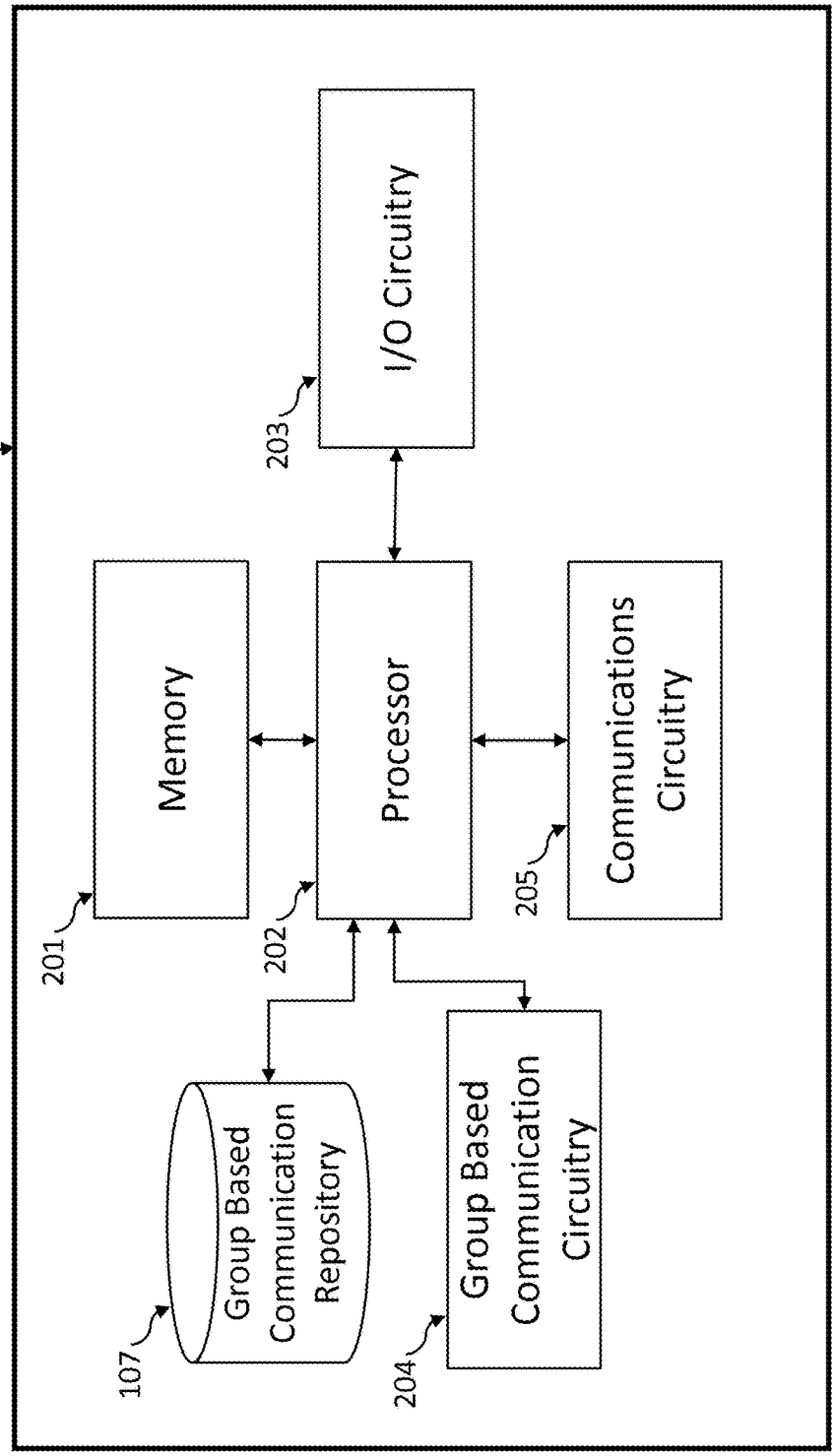
Figures 3A, 3B:
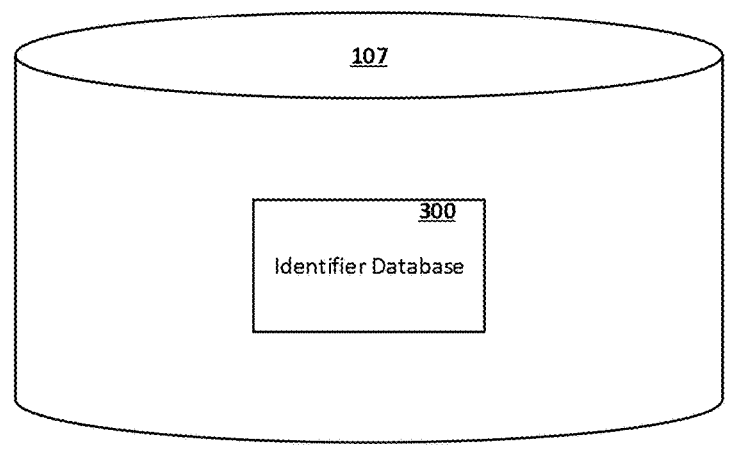
Figure 4:
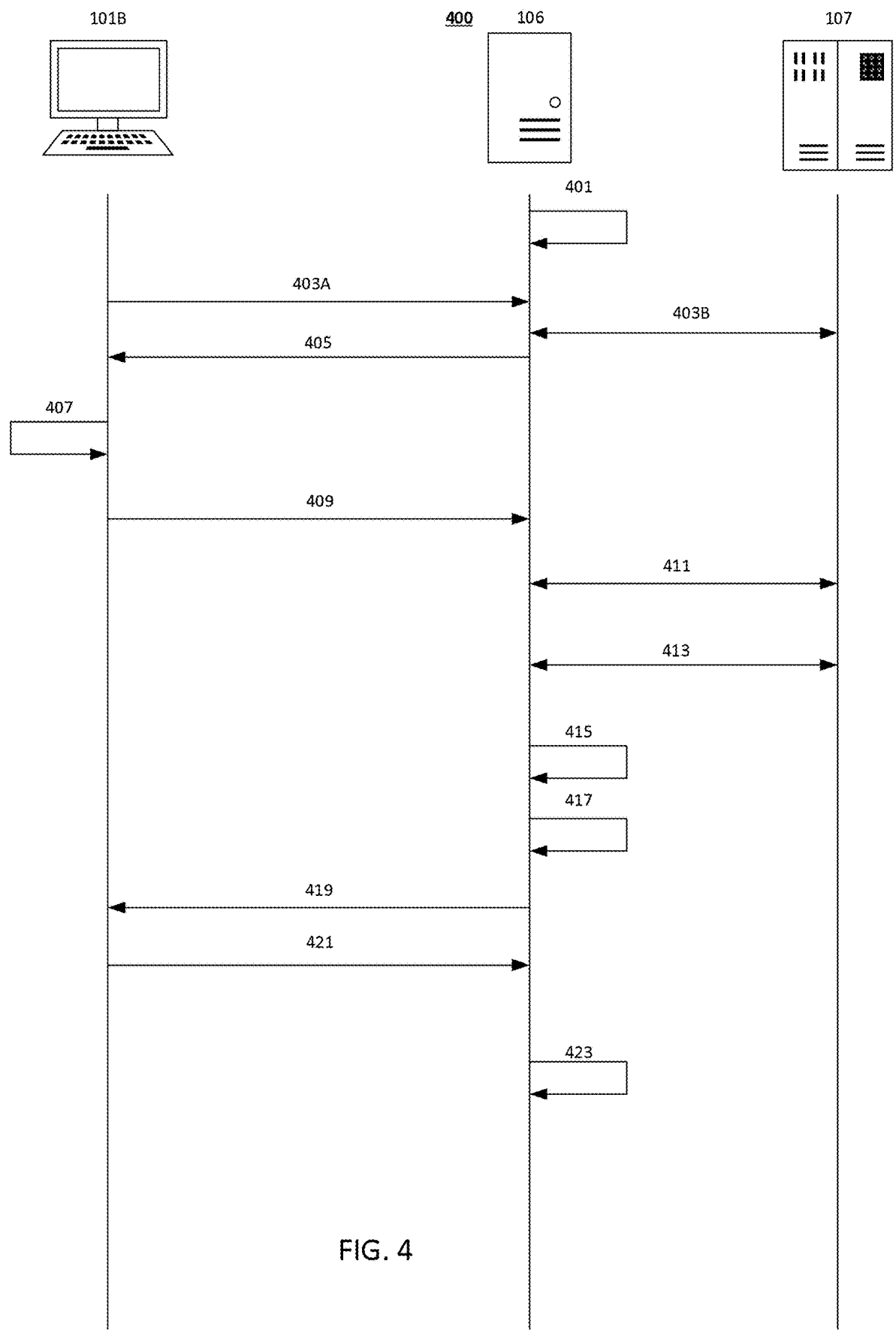
Figure 6:
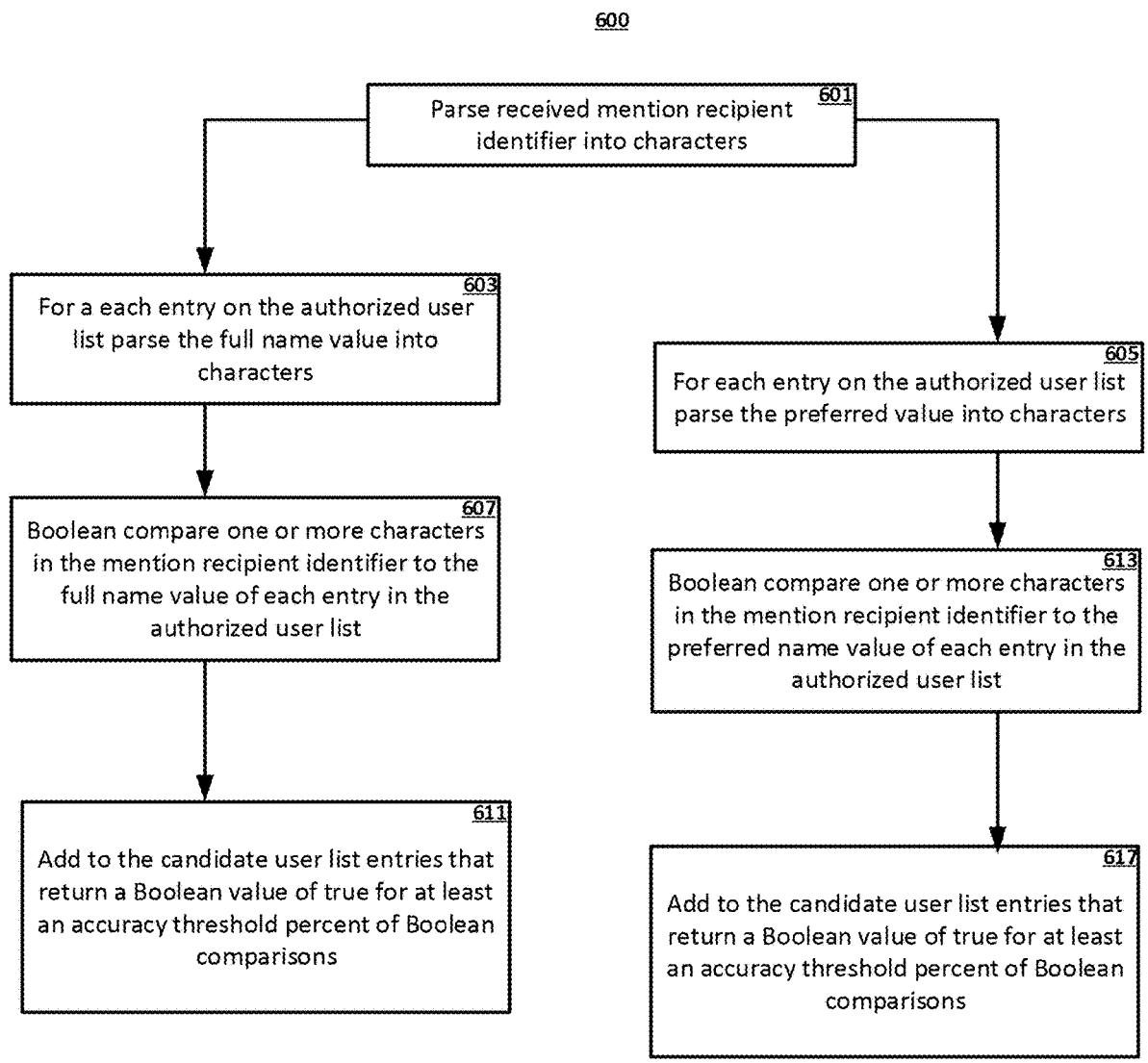
Figure 7:
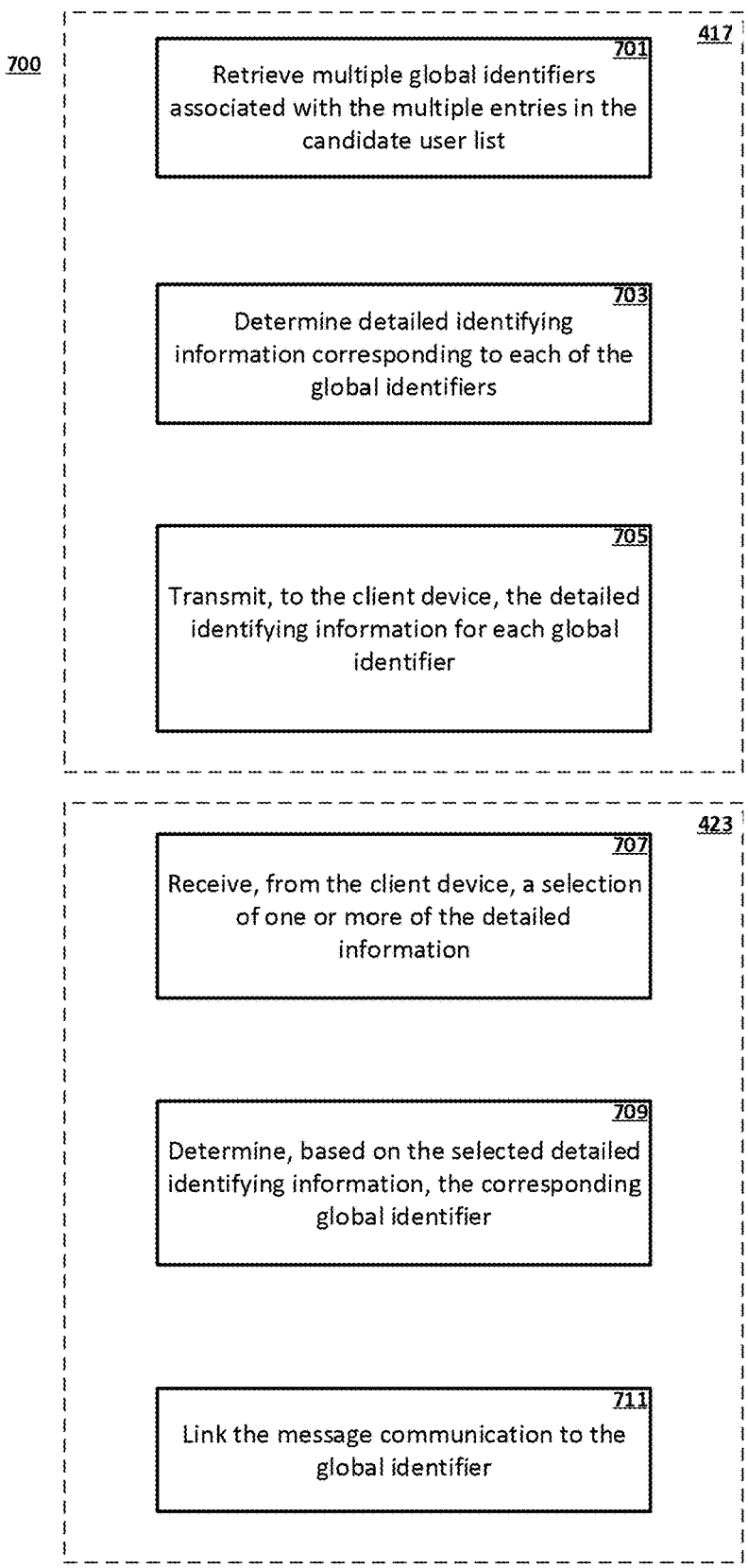
Figure 8:
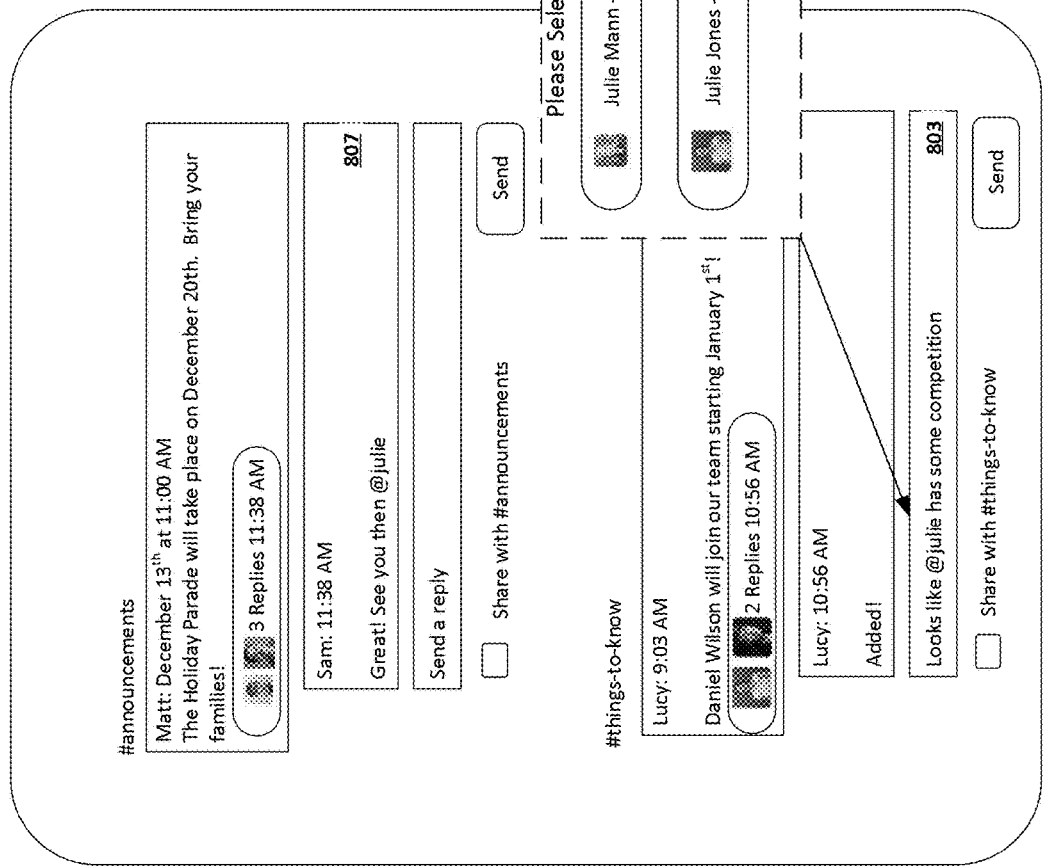
Figure 9:
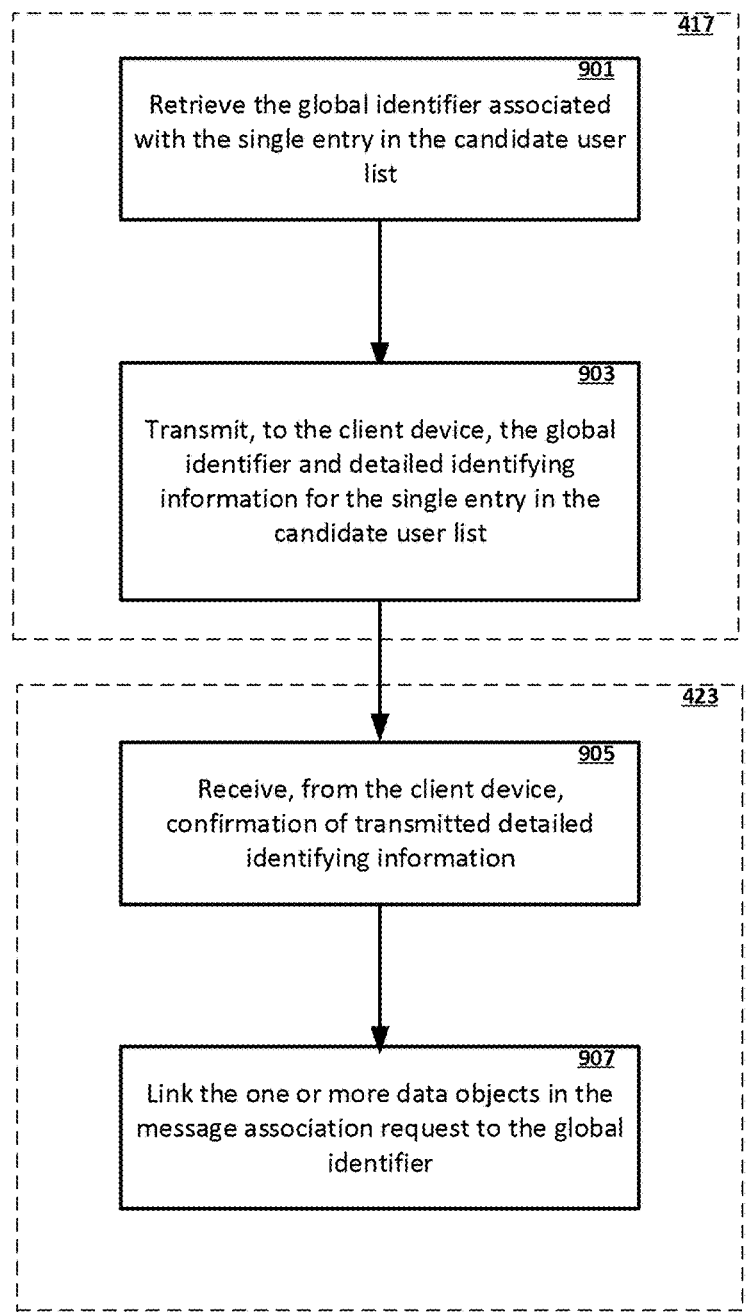
Figure 10:
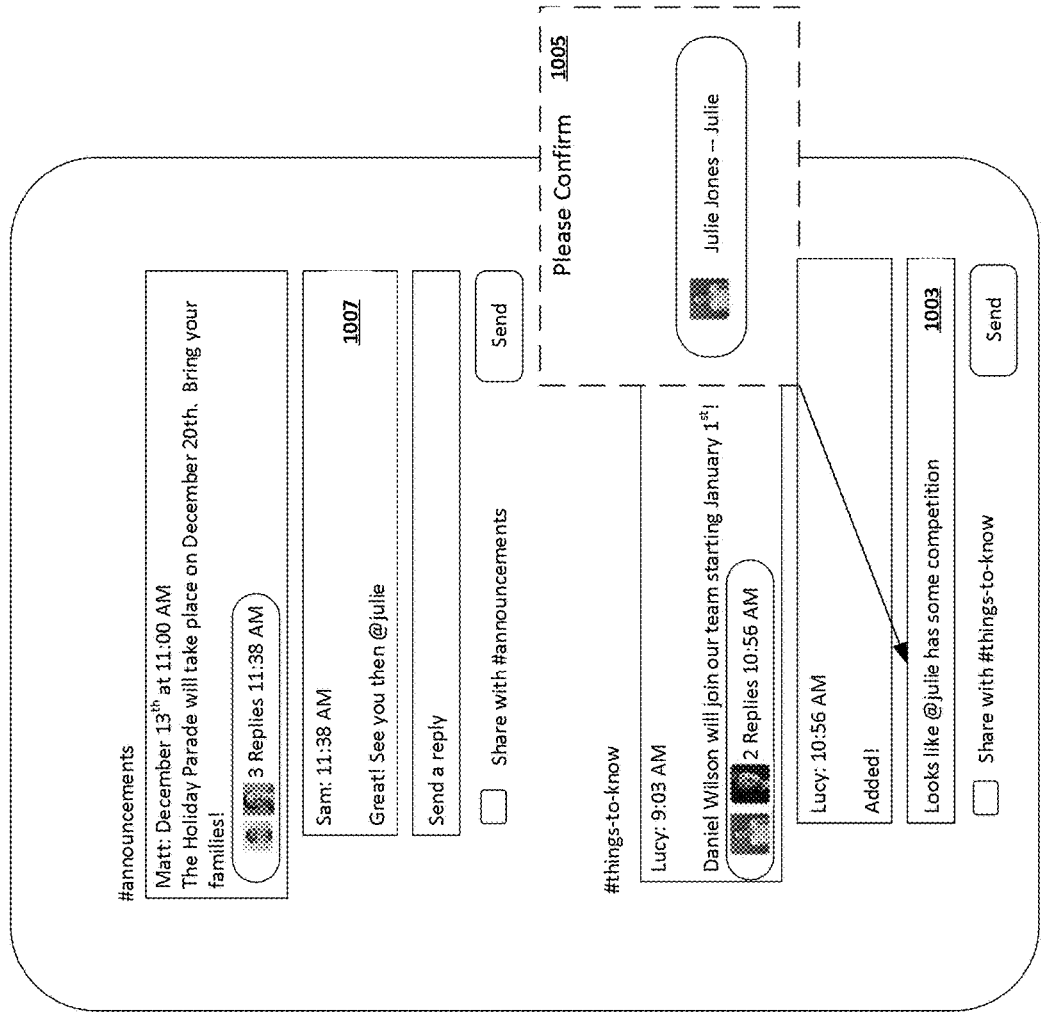
Figure 11:
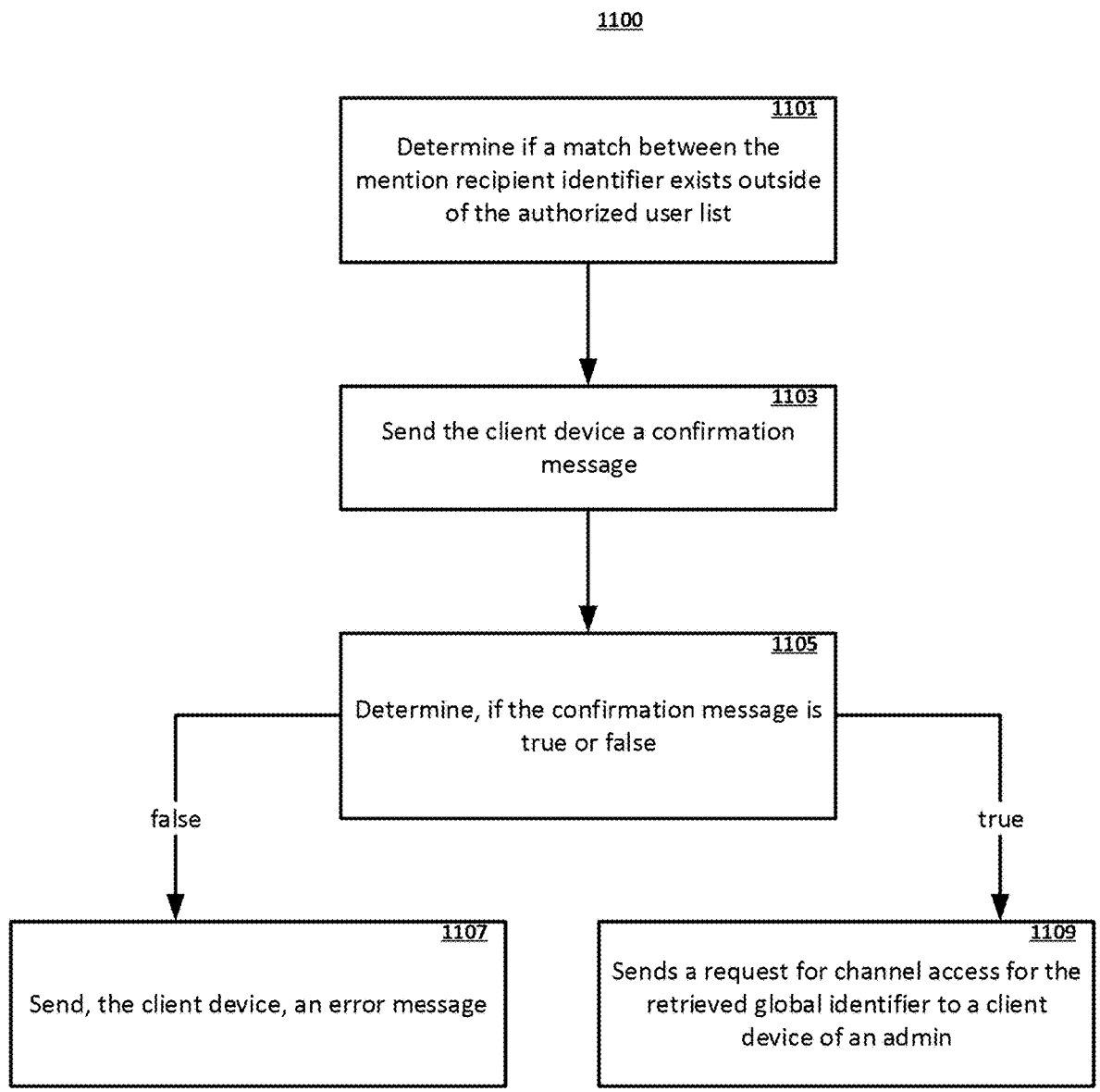

Having thus described the disclosure in general terms, reference will not be made to the accompanying drawings, which are not necessarily drawn to scale, and wherein:

FIG. 1 illustrates an exemplary group-based communication system within which embodiments of the present disclosure may operate;

FIG. 2 illustrates an exemplary apparatus for use within the exemplary group-based communication system in correspondence with embodiments of the present disclosure;

FIG. 3A illustrates an exemplary group-based communication repository for use with embodiments of the present disclosure;

FIG. 3B illustrates an exemplary database table in a group-based communication repository for use with embodiments of the present disclosure;

FIG. 4 illustrates an exemplary signal diagram for an exemplary process including a group-based communication server for use with embodiments of the present disclosure;

FIG. 5 illustrates an exemplary user interface of a client device for use with embodiments of the present disclosure;

FIG. 6 illustrates an exemplary process of a group-based communication server for use with embodiments of the present disclosure;

FIG. 7 illustrates an exemplary process of a group-based communication system for use with embodiments of the present disclosure;

FIG. 8 illustrates an exemplary user interface of a client device for use with embodiments of the present disclosure;

FIG. 9 illustrates an exemplary process of a group-based communication system for use with embodiments of the present disclosure;

FIG. 10 illustrates an exemplary user interface of a client device for use with embodiments of the present disclosure; and FIG. 11 illustrates exemplary process of a group-based communication system for use with embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to a group-based communication with a group-based communication system. The group-based communication system described in this disclosure comprises a group-based communication server and a group-based communication repository. The group-based communication server can authorize the creation of group-based communication channels. In addition, the group-based communication server authorizes and monitors access to message communications within the created group-based communication channels. The group-based communication server interacts with a plurality of client devices requesting to communicate via the group-based communication channels.

Deploying a group-based communication system introduces many technical challenges. The lack of a unified client directory requires a group-based communication system to have awareness of multiple clients associated with multiple groups. A group-based communication system must be capable of supporting a myriad of clients, groups, and communication between the clients and groups. A group-based communication system must be configured to support a variety of group-based communication interfaces. Group-based communication interfaces may differ greatly depending on the one or more groups associated with the group-based communication interface. For example, a group-based communication interface of an "Accounting" group may contain accounting specific information, while a group-based communication interface of an "Engineering" group may contain engineering specific information. Thus, the lack of a unified client directory requires a group-based communication system to have awareness of multiple clients associated with multiple groups.

It is desirable for the group-based communication system to support multiple groups and multiple clients while allowing users of a client device to easily identify and refer to a member of a group-based communication system. While ease of use from the user of a client device's perspective is important, it needs to be balanced with a group-based communication systems ability to uniquely identify members of a group-based communication system. Without associating a unified identifier with message communications with a group-based communication channel, locating users and searching for digital content is intolerably complex and tedious.

The inventors have identified that the system resources and time allocated to the deployment of a group-based communication system are easily exhausted and compromised as a result of the complex design, storage needs, and communication needs of a group-based communication system. The inventors have determined that the embodiments of the present disclosure enable a reduction in required computing resources and an improvement in the efficiency of data processing in the context of deployment of a group-based communication system.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to transmit data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, and the like.

"Group-based" is used herein to refer to a system, channel, message, or virtual environment that has security sufficient such that it is accessible only to a defined group of users. The group may be defined by common access credentials such as those of an organization. Access may further be facilitated by a validated request to join or an invitation to join transmitted by one group member user to another non-member user. Group identifiers (defined below) are used to associate data, information, messages, etc., with specific groups.

The term "group-based communication channel" or "channel" refers to a virtual communications environment or feed that is configured to display messaging communications posted by channel members (e.g., validated users accessing the environment using client devices) that are viewable only to the client devices that are associated with a user profile that has the proper identifiers to access the group-based communication channel. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices. A user interacts with the group-based communication system via an associated client device.

The terms "user profile," "user account," and "user account details" refer to information associated with a user, including, for example, a global identifier, a full name value, a display name value, a user avatar, a user title, a user identifier, one or more group-based communication channel identifiers associated with group-based communication channels that the user has been granted access to (i.e., a group identifier), an indication as to whether the user is an administrator of any group-based communication channels, an indication as to whether the user is a super administrator, a plurality of message communications, a plurality of emojis, a plurality of conversations, a plurality of conversation topics, an email address, a username (e.g., jdoe), a password, a time zone, a status, and the like. The user account details can include a subset designation of user credentials, such as, for example, login information for the user including the user's username and password.

The terms "group-based communication channel identifier," or "channel identifier" refer to one or more items of data by which a group-based communication channel may be identified. For example, a group-based communication channel identifier may comprise ASCII text, a pointer, a memory address, and the like.

The terms "group identifier" and "team identifier" refer to one or more items of data by which a group within a group-based communication system may be identified. For example, a group identifier may comprise ASCII text, a pointer, a memory address, and the like. The group identifier may be related to a user's title in an organization (e.g., on the Mobile Development team), status to in a group-based communication channel (e.g., a member of a group that has access to a specific channel) and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, a client device associated with a user may provide a messaging communication that includes text as well as an image and a video within the messaging communication as message contents. In such a case, the text, image, and video would comprise the messaging communication or digital content object. Each message communication sent or posted to a group-based communication channel of the group-based communication system includes metadata comprising one or more of the following: a sending user identifier, a message identifier, message contents, a global identifier, user identification, originator identifier a group identifier, display name value, full name value, and a group-based communication channel identifier. Each of the foregoing identifiers may comprise ASCII text, a pointer, a memory address, and the like.

A "sending user identifier" is associated with a collection of message communications that are sent by a particular user (i.e., a client device associated with the particular user). These message communications may be analyzed to determine context regarding the user (e.g., the user's expertise or interest in a topic may be determined based on the frequency of mention of the topic or key words associated with the topic within such message communications).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message communication or file (e.g., access to the message communication, such as having the message communication or file return as part of search results in response to a search query, may be restricted to those users having the group identifier associated with their user profile). The group identifier may be used to determine context for the message communication (e.g., a description of the group, such as the name of an organization and/or a brief description of the organization, may be associated with the group identifier).

Group-based communication system users may join group-based communication channels. Some group-based communication channels may be globally accessible to those users having a particular group identifier associated within their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message communication (e.g., access to the message communication, such as having the message communication return as part of search results in response to a search query, may be restricted to those users having the group-based communication channel identifier associated with their user profile, or who have the ability to join the group-based communication channel). The group-based communication channel identifier may be used to determine context for the message communication (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "message association request" refers to one or more items of data by which a client device associated with a first user profile may request to associate one or more message communications in a group-based communication channel with a global identifier associated with a second user profile. In embodiments, a message association request may be a request by a client device associated with a first user profile to associate one or more message communications in a group-based communication channel with a plurality of global identifiers associated with a plurality of other user profiles.

The terms "originator identification" or "originator identifier" refer to one or more items of data by which the originator of a request (e.g., message association request) may be identified. The originator identification may be an email address, user identifier, global identifier, full name value, display name value, group identifier, an IP address, or any other type of information that can identify a requesting entity.

The term "channel settings" refers to various defined or definable parameters of a group-based communication channel. The channel settings may comprise a channel type, a channel name string, and a channel purpose string. A channel type refers to a data structure that informs a group-based communication server that the group-based communication channel is of at least one of the following types: a directed channel type, a promoted channel type, group-to-group channel type, and a private channel type. A channel name string refers to a data structure containing a string of alphanumerical characters for identifying a channel in non-technical terms. A channel purpose string refers to a data structure containing a string of alphanumerical characters that indicates to a group-based communication server and/or a user a purpose of the group-based communications channel. In some examples, a channel purpose string may contain a channel purpose such as "to work on project Nucleus." Channel settings may also include a message retention window that indicates a period of network time during which message communications associated with a group-based communication channel are retained within a group-based communication repository. Upon expiration of the period of network time (i.e., the message retention window), a message communication or file associated with the message retention window may be deleted from a group-based communication repository. Channel settings may also include one or more of a group capacity and a user capacity that, when applicable, indicates the number of groups (or users) authorized to access the particular group-based communication channel; and, when applicable one or more group identifier values that indicate the group identifier(s) of one or more groups that must be associated with a user profile in order for access by that user to the group-based communication channel is authorized. In some embodiments, if a user associated with a client device attempts to access a group-based communication channel and the user capacity has been reached, the client device may not be permitted to access the group-based communication channel. The channel settings may also include one or more authorized application identifiers that indicate to a group-based communication server which applications are authorized to be downloaded and utilized in the group-based communication channel. In embodiments, if an application attempts to access a group-based communication channel and the application is not associated with an authorized application identifier, the application may not be granted access to the group-based communication channel.

The term "directed channel type" refers to a data type associated with a group-based communication channel that indicates to a group-based communication server to whitelist all group and global identifiers for the group-based communication channel. Thus, every member of an organization is allowed to access the group-based communication channel. For example, every member of an organization is associated with one or more group-based communication server issued identifiers, including a global identifier. When a client device attempts to accesses a group-based communication channel associated with the directed channel type, the group-based communication server compares one or more global identifiers to a whitelist of authorized identifiers (which contains all group and global identifiers associated with the organization) to determine if a user associated with the client device has authorized access rights to the group-based communication channel. In some embodiments, client devices associated with a user profile that has super administrator rights have the ability to write and edit message communication in a directed channel type group-based communication channel. All other members of the directed channel type group-based communication channel may only read (but not edit, write, or delete) message communications in the directed channel type group-based communication channel.

The term "promoted channel type" refers to a data type associated with a group-based communication channel that indicates to a group-based communication server that the group-based communication channel is a public opt-in group-based communication channel, public default channel type, public mandatory channel type, or a private group-based communication channel type. In a private group-based communication channel type, access control parameters comprise a whitelist of global identifiers associated with users allowed to access the group-based communication channel.

The term "public opt-in promoted channel type" refers to a data type associated with a group-based communication channel that indicates to a group-based communication server access control parameters that comprises a whitelist (i.e., grant access to) for all group and global identifiers of an organization. However, in contrast to the direct channel type, the public opt-in promoted channel type allows all members of the group-based communication channel (via a client device) to write message communications in the group-based communication channel. For example, if a user is associated with a group identifier that is associated with a group within the organization, then the group identifier may be included in a whitelist such that every client device associated with a user profile that is associated with the group identifier is granted access to the group-based communication channel. In another example, if a user is associated with a global identifier that indicates the user is a member of the organization, then every global identifier associated with the organization may be included in a whitelist.

The term "public default promoted channel type" refers to a data type associated with a group-based communication channel that indicates to a group-based communication server to whitelist (i.e., grant access to) a corresponding group identifier. Furthermore, user profiles, via a request from an associated client device to a group-based communication server, may become associated with the corresponding group identifier. In such an instance, a client device associated with a user profile will transmit a channel access request to a group-based communication server. The group-based communication server will, based on the received group-based communication channel identifier, query a group-based communication repository to find the requested group-based communication channel. The group-based communication server then identifies that the requested group-based communication channel is a public default promoted channel type and will forward a corresponding group identifier along with the user's global identifier to an identifier database within the group-based communication repository to update the user's profile to include the group identifier that is whitelisted for access to the requested group-based communication channel. Thus, public default promoted channel type group-based communication channels automatically accept requests from client devices to access a public default promoted channel type.

The term "public mandatory promoted channel type" refers to a data type associated with a group-based communication channel that indicates to a group-based communication server to, without a user or client device interaction (i.e., automatically), associate a corresponding whitelisted group identifier with user profiles associated with an access control list of global identifiers such that client devices associated with whitelisted group identifiers can access the group-based communication channel. In some embodiments, the group identifier is not removable from the user profile by the user. Thus, a user is identified via their global identifier and the group-based communication server automatically updates the user's profile with a corresponding group identifier. As a result, the public mandatory promoted channel type group-based communication channels not only automatically associate a group identifier with the user profile (i.e., joins the user to the group-based communication channel), but also disables a user's ability to disassociate with the group-based communication channel.

The term "group-to-group channel type" refers to a data type associated with a group-based communication channel that indicates to a group-based communication server that the group-based communication channel is associated with whitelist for allowing access to client devices that are associated with user profiles associated with one or more specific group identifiers. Thus, the group-to-group channel type is shared between two or more authorized groups within an organization. Each of the authorized groups can be identified by a group identifier within the channel settings of the group-based communication channel. A group-to-group channel type may also be referred to as a cross-work space channel type.

The term "private channel type" refers to a data type associated with a group-based communication channel that indicates to a group-based communication server that the group-based communication channel is private (as defined above). In some embodiments, group-to-group, promoted, and directed channel types may all be private so long as an access control list associated therewith is confined to specific user identifiers associated with authorized users.

The terms "group administrator," "group admin," or "team administrator," or "team admin" refers to credentials or identifiers associated with an user profile that indicate to a group-based communication server that a client device associated with the user profile may edit access control parameters (e.g. channel settings) of respective groups and group-based communication channels having group-based communication channel identifiers associated with the user profile. In some embodiments, client devices associated with group administrators transmit channel creation requests to the group-based communication server to create group-based communication channels for a particular group. Client devices associated with users identified as group administrators may edit the access control rights to a group or group-based communication channel which the group is a part of. Client devices associated with users identified as group administrators may also add users to the group or group-based communication channel which the group is a part of or to invite users to a group or group-based communication channel which the group is a part of. The access control parameters editable by the client device associated with a user identified as a group administrator may be limited by the settings set by a client device associated with a user identified as a super administrator.

The term "super administrator" refers to an identifier associated with a user profile that indicates to a group-based communication server that a client device associated with the user profile may control, access, and modify any group-based communication channel (including private group-based communication channels) settings. The client device associated with a user identified as a super administrator may also assign group administrator rights to members of the organization. The client device associated with a user identified as a super administrator may delegate rights to administrators and/or users. The client device associated with a user identified as a super administrator may also be referred to as an organization owner.

The term "global identifier" refers to one or more items of data by which a user or user's client device may be uniquely identified across the group-based communication system. In embodiments where the group-based communication system spans multiple organizations the global identifier is unique across multiple organizations. The global identifier is a 64 bit unsigned integer or a base34 encoded string that uniquely identifies a user.

The term "identifier database" refers to a database, repository, memory, collection of memory, non-volatile memory, the like, and/or any combination of mentioned and equivalent elements that stores global identifiers, group identifiers, and one or more other parts of detailed identifying information. When applicable, the identifier database associates the user's global identifier with her or his group identifiers and group-based communication channel identifiers. For example, user Chad has a global identifier within the group-based communication system of 1000000006450806360. Chad also belongs to the development group and marketing group at the organization. Thus, Chad will also have a development group identifier (i.e., Dev_mem) and a marketing group identifier (i.e., Mar_mem). The identifier database contains a data structure that associates the global identifier of 1000000006450806360 with Dev_mem and Mar_mem.

The term "full name value" refers to one or more items of data by which a user's full name may be identified across the group-based communication system. The full name value may be part of a user's profile. The full name value also can be associated with a corresponding global identifier.

The term "display name value" refers to one or more items of data by which a user's display name may be identified across the group-based communication system. The display name value may be part of a user's profile. The display name value can also be associated with a corresponding global identifier.

The term "detailed identifying information" refers to one or more items of data besides a global identifier that identify a user. Full name value, display name value, a user avatar, a user's favorite quote, a user's employee number, a user's social media friend list, a user's title value and the like are all examples of detailed identifying information. The detailed identifying information may be part of a user's profile. The detailed identifying information can also be associated with a corresponding global identifier.

The term "user title value" refers to one or more items of data used to indicate a user's title within the organization or a group. For example, the user title value of a CEO of a company may be "Chief Executive Officer." In other embodiments, the user title value may be a self-described status. For example, the same CEO may have the user title value of "Most Awesome Guy Ever." The user title value may be part of a user's profile and may be associated with a corresponding global identifier.

The term "authorized user identifier list" refers to an array comprising one or more potential entries generated by a group-based communication server based on access control parameters for a specific group-based communication channel that indicates one or more whitelisted users for the group-based communication channel. Each potential entry comprises all or portions of a user profile for a user who is authorized to communicate in the group-based communication channel. Each potential entry may include one or more of a global identifier and detailed identifying information. For example, in a group-based communication channel for the privacy team and the mobile team, an authorized user identifier list would comprise of the global identifier and detailed identifying information for all users that may access the group-based communication channel. In one embodiment, a group-based communication server will populate this list by determining which user profiles are associated with a group identifier for the privacy team and/or the mobile team and loading into authorized user identifier list the global identifier and associated detailed identifying information for each one of those users.

The term "candidate user list" refers to a filtered authorized user identifier list. A group-based communication server is configured to filter the authorized user identifier list based on one or more factors (e.g., a mention recipient identifier) and generate the candidate user list. In some embodiments, filtering the authorized user identifier list involves removing the global identifier and associated detailed identifying information related to one or more users from the authorized user identifier list and producing a subset of the authorized user identifier list in the form of the candidate user list. The candidate user list may also be a ranked authorized user identifier list as opposed to a filtered authorized user identifier list. In such an instance, a group-based communication server is configured to rank the authorized user identifier list based on one or more factors (e.g. a mention recipient identifier) and generate the candidate user list.

The term "mention recipient identifier" refers to one or more items of data received from a client device and used by a group-based communication server to identify an intended recipient of a mention in a group-based communication channel. The mention recipient identifier may be a full name value or a display name value. The mention recipient identifier is associated by a group-based communication server with a corresponding global identifier. On a client device, the mention recipient identifier may be rendered for display as a full name value or a display name value. For example, in the text "Hey @David Le check out this attachment!", "David Le" would be the mention recipient identifier. In this case, "David Le" is a full name value and is rendered for display as "David Le" on a client device. However, the group-based communication server of the group-based communication system translates the full name value to the global identifier associated with user David Le. Thus, @David Le references directly to the unique global identifier associated with the user David Le. By implementing the full name value or display name value, the group-based communication system may allow more than one user to have the same display name value or shared name value.

The term "mention" or "tag" refers to a process performed by a group-based communication server to associate a global identifier with message communications that are configured to be displayed within a group-based communication channel. The group-based communication server stores, within the group-based communication repository, the message communication along with the associated global identifier. The symbol "@" is used to signal to the group-based communication server that the sending user intends to render a mention or a tag. For example "@John" indicates to the group-based communication server that the global identifier of John is being mentioned or tagged. In some embodiments, when the group-based communication server associates a global identifier with one or more message communications, the group-based communication server transmits a notification to a client device associated with the global identifier indicating that the user associated with the global identifier has been mentioned in a message communication in a group-based communication channel. In addition, the group-based communication server may transmit to the associated client device the message communication with the notification.

The term "whitelist" refers to a data structure containing access control parameters that indicate to a group-based communication server, through the use of identifiers, one or more members of a group-based communication system are authorized to perform an action (e.g., joining a group-based communication channel or group). The authorized members may be identified by one or more identifiers such as a global identifier, user identifier, and/or group identifier.

The term "blacklist" refers to a data structure containing access control parameters that indicate to a group-based communication server, through the use of identifiers, one or more members of a group-based communication system that are restricted or not authorized to perform an action (e.g., joining a group-based communication channel or group). The unauthorized members may be identified by one or more identifiers such as a global identifier, user identifier, and/or group identifier.

The term "channel access request" refers to one or more items of data by which a client device of a group-based communication system may request access to a group-based communication channel via the group-based communication server. The channel access request comprises a group-based communication channel identifier. In some embodiments, the channel access request may further comprise a global identifier and/or a group identifier associated with a user profile.

The term "summary array" refers to rendered graphical display within a client device that depicts one or more entries in a candidate user list. The summary array may render for display one or more portions of detailed identifying information for each entry in a candidate user list. For example, the summary array may render for display a full name value, a user avatar, and a display name value corresponding to each entry within a candidate user list.

The term "defined display window" is a defined area within a GUI (graphical user interface) displayed on a client device where data is rendered and displayed.

The term "channel list pane" refers to a defined display window configured to display lists of group-based communication channels that are configured to indicate when new messaging communications are received in the respective group-based communication channels. The channel list pane may include actuators for initiating requests to view selected group-based communication channels. The channel list pane may include additional information, such as messaging communications, notifications, the name of the group, name of the particular member viewing the interface, and the like.

The term "thread communication pane" refers to a defined display window configured to display a selected group-based communication channel. The thread communication pane may include a variety of information, such as messaging communications, and may include a variety of actuators for initiating requests.

The term "thread summary communication pane" refers to a defined display window configured to display a summary of group-based communication channels of which a user profile associated with a client device is a member. The summary can include at least a portion of one or more message communications. The thread summary communication pane may also display various notifications, actuators, and indicators/indications. A channel messaging pane is a display pane configured to display a selected group-based communication channel and may display a variety of information and a variety of notifications, actuators, and indicators/indications.

The term "members of the organization" and other like phrases refer to users or users client devices that are successfully authenticated as being associated with an organization. For example, a user is a member of the ABC Company if the user's client device is registered and authorized to access computing resources associated with ABC Company.

Example System Architecture

Methods, apparatuses, and computer program products of the present disclosure may be embodied by any of a variety of devices. For example, the method, apparatus, and computer program product of an example embodiment may be embodied by a networked device (e.g., an), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 operates as a security apparatus for the group-based communication system 105. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a messaging communication may be sent from a client device 101A-101N to a group-based communication system 105. In various implementations, the message communication may be sent to the group-based communication system 105 over communications network 104 directly by a client device 101A-101N, the message communication may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message communication may include data such as a message identifier, sending user identifier, a group identifier, a group-based communication channel identifier, message contents (e.g., text, emojis, images, links), attachments (e.g., files), message hierarchy data (e.g., the message communication may be a reply to another message communication), third party metadata, and/or the like. In one embodiment, the client device 101A-101N may provide the following example message communication, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several example client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
```

```
Safari/9537.53</user_agent_string>
        <client_product_type>iPhone6,1</client_product_type>
        <client_serial_number>DNXXX1X1XXXX</client_serial_number>
    <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>Error! Reference source not found..app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
    <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting disclosure. I have attached a copy our patent
policy.</contents>
        <attachments>patent_policy.pdf</attachments>
    </message>
</auth_request>
```

The group-based communication system 105 comprises at least one group-based communication server 106 that may create a storage message based upon the received message communication to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
```

-continued

```
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting disclosure. I have attached a copy our
patent policy.</contents>
    <attachments>patent_policy.pdf</attachments>
    <conversation_primitive>
        conversation includes messages: ID_message_8,
ID_message_9, ID_message_10,
        ID_message_11, ID_message_12
    </conversation_primitive>
</storage_message>
```

In embodiments, a group identifier as defined above may be associated with the message.

In embodiments, a group-based communication channel identifier as defined above may be associated with the message communication. In embodiments, a full name value as defined above may be associated with the message communication. In embodiments, a display name value as defined above may be associated with the message. In embodiments, detailed identifying information as defined above may be associated with the message communication.

In embodiments, a sending user identifier as defined above may be associated with the message communication. In one implementation, the message communication may be parsed (e.g., using PHP commands) to determine a sending user identifier of the user who sent the message communication.

In embodiments, topics may be associated with the message communication. In one implementation, the message contents may be parsed (e.g., using PHP commands) to determine topics discussed in the message communication. For example, hashtags in the message communication may indicate topics associated with the message communication. In another example, the message communication may be analyzed (e.g., by itself, with other message communications in a conversation primitive) or parsed using a machine learning technique, such as topic modeling, to determine topics associated with the message communication.

In embodiments, data indicating responses may be associated with the message communication. For example, responses to the message communication by other users may include reactions (e.g., selection of an emoji associated with the message communication, selection of a "like" button associated with the message communication), clicking on a hyperlink embedded in the message communication, replying to the message communication (e.g., posting a message to the group-based communication channel in response to the message communication), downloading a file associated with the message communication, sharing the message from one group-based communication channel to another group-based communication channel, pinning the message communication, starring the message communication, and/or the like. In one implementation, data regarding responses to the message communication by other users may be included with the message communication, and the message communication may be parsed (e.g., using PHP commands) to determine the responses. In another implementation, data regarding responses to the message communication may be retrieved from a database. For example, data regarding responses to the message communication may be retrieved via a MySQL database command similar to the following:

SELECT messageResponses
FROM MSM_Message
WHERE messageID=ID_message_10.

For example, data regarding responses to the message may be used to determine context for the message communication (e.g., a social score for the message from the perspective of some user). In another example, data regarding responses to the message communication may be analyzed to determine context regarding the user (e.g., the user's expertise in a topic may be determined based on the responses to the user's message communication regarding the topic).

In embodiments, attachments may be included with the message. If there are attachments, files may be associated with the message. In one implementation, the message communication may be parsed (e.g., using PHP commands) to determine file names of the attachments. For example, file contents may be analyzed to determine context for the message communication (e.g., a patent policy document may indicate that the message communication is associated with the topic "patents").

In embodiments, third party metadata may be associated with the message communication. For example, third party metadata may provide additional context regarding the message communication or the user that is specific to a company, group, group-based communication channel, and/or the like. In one implementation, the message communication may be parsed (e.g., using PHP commands) to determine third party metadata. For example, third party metadata may indicate whether the user who sent the message communication is an authorized representative of the group-based communication channel (e.g., an authorized representative may be authorized by the company to respond to questions in the group-based communication channel).

In embodiments, a conversation primitive may be associated with the message communication. In one implementation, a conversation primitive is an element used to analyze, index, store, and/or the like message communications. For example, the message communication may be analyzed by itself, and may form its own conversation primitive. In another example, the message may be analyzed along with other message communications that make up a conversation, and the message communications that make up the conversation may form a conversation primitive. In one implementation, the conversation primitive may be determined as the message communication, a specified number (e.g., two) of preceding message communications and a specified number (e.g., two) of following message communications. In another implementation, the conversation primitive may be determined based on analysis of topics discussed in the message communication and other message communications (e.g., in the group-based communication channel) and/or proximity (e.g., message send order proximity, message send time proximity) of these message communications.

In embodiments, various metadata, determined as described above, and/or the contents of the message communication may be used to index the message communication (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message communication may be determined and the message communication may be indexed in group-based communication repository 107. In one embodiment, the message communication may be indexed such that a company's or a group's message communications are indexed separately (e.g., in a separate index associated with the group and/or company that is not shared with other groups and/or companies). In one implementation, message communications may be indexed at a separate distributed repository (e.g., to facilitate data isolation for security purposes).

If there are attachments associated with the message communication, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository107 and group-based communication circuitry 204. The apparatus 200 may be configured to execute the operations described above with respect to FIG. 1 and below with respect to FIGS. 3-11. Although these components 107 and 201-205 are described with respect to functional limitations, it should be understood that the particular implementations necessarily include the use of particular hardware. It should also be understood that certain of these components 107 and 201-205 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Identifiers within a User Profile

FIG. 3B illustrates an exemplary database table 310 within an exemplary identifier database 300, according to embodiments of the present disclosure. As shown in FIG. 3A, the identifier database 300 may be part of the group-based communication repository 107 as shown in FIG. 1. Each user of the group-based communication system 105 has identification information stored in the identifier database 300. In some embodiments, database table 310 includes global identifiers 301, full name values 303, display name values 305, and group identifiers 307. The elements shown in FIG. 3B can also be associated with a user profile or may be part of a user profile.

Each member of an organization that utilizes the group-based communication system is associated with a global identifier. The global identifier may be stored (e.g. within the identifier database 300) as a 64 bit unsigned integer and represented externally (outside of memory) as a base34 encoded string. The process for converting the 64 bit unsigned integer to the base34 encoded string is described related U.S. provisional application Ser. No. 62/554,952 entitled "METHOD, APPARATUS, AND COMPUTER PROGRAM PRODUCT FOR AUTHORIZING AND AUTHENTICATING USER COMMUNICATION WITHIN AN ENTERPRISE GROUP-BASED COMMUNICATION PLATFORM," the contents of which are incorporated herein by reference in their entirety. As a truncated example, the exemplary database table 310 illustrates the global identifier 301 in base34 encoded string form. The global identifier 301 uniquely identifies a single user in the group-based communication system 105. In embodiments where the group-based communication system 105 spans multiple organizations, the global identifier 301 is still only associated with a single user. Whenever a request is made (e.g., an API (application program interface) request), the request includes the global identifier associated with a user. For example, an API request "channels.info" uses global identifiers to retrieve and return a list of members (associated with the global identifiers) who are allowed to access a group-based communication channel. By doing so, the group-based communication system is able to quickly identify users and efficiently process the request.

Full name value 303 is a value that indicates a user's full name. As shown in FIG. 3 the global identifier W12345678 is associated with a user whose full name is Mary James. Although full name value 303 is shown as a string it is possible to store the full name value in another form such as an integer, symbol, or character. This alternate storage method may be useful when the user's full name may include non ASCII characters, symbols, or various foreign characters. Regardless of how the full name value 303 is stored, it is rendered for display, on a client device, as a human readable string. When a user initially registers with the group-based communication system, the user provides a full name value 303. The user may edit her/his full name value 303 at any time subsequent to registration.

Display name value 305 is a value that indicates a user's display name. As shown in FIG. 3 the global identifier W12345678 is associated with a user whose full name is Mary James and display name is Mary. Although display name value 305 is shown as a string it is possible to store the display name value in another form such as an integer, symbol, or character. This alternate storage method may be useful when the user's display name may include non ASCII characters, symbols, or various foreign characters. Regardless of how the display name value is stored, it is rendered for display, on a client device, as a human readable string. Providing a display name value 305 at the time of registration is optional. A user may add or edit her/his display name value 305 at any time. In one embodiment, if a user does not provide a display name value, then the display name value is automatically populated with the full name value associated with the user. For example, if a user with the full name value of Mary James does not provide a display name value, then the display name value will also be Mary James.

The display name value 305 allows the users in the group-based communication system to refer to or mention other users in a casual and friendly language as opposed to using usernames. This helps increase the usability of the group-based communication system. For example suppose Walter White (as shown in FIG. 3B) would like to tag/mention Mary James in a message communication within group-based communication channel. Walter, via his client device, can enter the text "Hey @Mary look at the attachment from Aug. 17, 2017." This is preferable to using a unique username for Mary, which may read "Hey @mdjames70596 look at the attachment from Aug. 17, 2017." Often usernames uniquely refer to users, but the usernames are also unique texts themselves, such that no two usernames are or can be the same. This is problematic because it forces users to memorize, recall, or at least identify a user by their user identifier. Instead it is preferable to refer to a user as one would in real life, which is typically by their display name. In other embodiments, as will be described later, a user may be referred to by their full name as well as (or in lieu of) their display name.

Group identifier 307 is a value that indicates which group a user belongs to. Unlike the global identifier, a user is associated with a different group identifier for each group they are a member of. In reference to David Le in FIG. 3B, David has one group identifier for the domestic sales group. In contrast Amy has 3 distinct group identifiers. Amy is a member of ABC Company's mobile team and has a mobile group identifier. Amy is a member of ABC Company's security team and has a security group identifier. Amy is a member of ABC Company's core product team and has a core product group identifier. When the group-based communication system is used for multiple organizations the group identifier value will include an identifier that identifies the organization which the group belong to.

A user title value may also be included (not shown) in database table 310. A user title value refers to one or more items of data that indicates a user's title within the organization or a group. For example, Mary James may have a user title value of "Security Team Lead." Each user may edit their user title.

A user avatar may also be included (not shown) in database table 310. A user avatar is a digital visual representation of a user. The avatar may be digital photo of the user or an electronically created digital caricature of the user.

The use of full name values, display name values and global identifiers allows the group-based communication system to accommodate international users. As shown in FIG. 3B, Taro Yamada is a Japanese employee in the international mobile group. Taro frequently works with both U.S. and Japanese colleagues. Taro's full name value would comprise of his name in English name as well as his name in Japanese (山田 太郎). Similarly, Taro's display name value would comprise his display name in English (Taro) as well as his display name in Japanese (Taro-chan or 太郎ちゃん). By associating Taro's user profile with his English and Japanese full name value and English and Japanese display name value, the group-based communication system may recognize both. For example, Taro's Japanese colleagues may mention him using "太郎ちゃん" and Taro's English colleagues may mention him by using "Tar." This allows the group-based communication system to accommodate those users with not only multiple names but international names because the full name and display name values are values associated with a user's unique global identifier. As a result, the group-based communication system may support non ASCII characters.

As detailed in FIG. 3B, a user may have multiple display name values and multiple full name values. This may be additionally advantageous when people change their names. For example Mary James (in FIG. 3B) may get married to David Le and change her name to Mary Le. In such an instance, other users may be able to identify Mary, by either Mary James (for possibly a limited amount of time) or Mary Le.

Once a user's profile and associated identifiers have been established in the group-based communication system, an identity tagging system may be implemented to efficiently associate message communications in one or more group-based communication channels with a specific intended user of the group-based communication system.

Identity Tagging to Message Communications

FIG. 4 shows exemplary process 400 for associating identifiers associated with intended users with one or more message communications in a group-based communication channel. Process 400 starts at step 401 where the group-based communication server 106 creates a group-based communication channel. The group-based communication channel may be created by an authorized user and may have channel settings that indicate the type and parameters of the group-based communication channel. Each group-based communication channel has specific channel settings that indicate various access control parameters (as set by a group administrator or super administrator). As described in the definitions above, each group-based communication channel type may have different access control parameters. For example a group-to-group group-based communication channel type has access control parameters that indicate to the group-based communication server 106 to allow client device access to the group-based communication channel based on one or more group identifiers in an associated user's profile.

Once a group-based communication channel is created process 400 moves to step 403. At step 403A, a client device 101B transmits a channel access request to access the previously created group-based communication channel. The channel access request includes a group-based communication channel identifier for the group-based communication channel and a global identifier associated with the user of the client device 101B. At step 403B the group-based communication server 106 queries the group-based communication repository 107 to retrieve the access control parameters of the group-based communication channel. Based on the retrieved access control parameters, the group-based communication server 106 determines if the client device 101B is allowed access. For example, in a group-to-group group-based communication channel, the group-based communication server 106 may use the received global identifier to query the identifier database within the group-based communication repository 107 to determine if the associated user profile is associated with a group identifier that is whitelisted to access the group-based communication channel. If the query reveals a whitelisted group identifier that is associated with the user profile, then the client device 101B is allowed access and the process moves to step 405. If the authorization fails, the process exits.

At step 405, the group-based communication server 106 grants the client device 101B access to the requested group-based communication channel.

At step 407, the client device 101B displays through a GUI (graphical user interface) message communications that are configured to be displayed in the group-based communication channel. The client device 101B receives a mention recipient identifier from the user of the client device 101B. In some embodiments, the mention recipient identifier is accompanied by or is part of a message communication that is to be displayed in the group-based communication channel.

In other embodiments, the user of the client device 101B may enter a mention recipient identifier without a message communication in order to search for a particular user within the group-based communication channel and/or the group-based communication system. For example, the client device 101B may receive "@Mary" in order to search for message communications that mention "Mary." With brief reference to FIG. 3B, anytime a user enters or sees a mention for a user, the mention uses either a full name value or a display name value, in some embodiments. The user (with the exception of a super administrator or group administrator) does not mention Mary James by her global identifier (W12345678). Now with reference to FIG. 5.

FIG. 5 illustrates an exemplary GUI 500 for display by the client device 101B at step 407. GUI 500 includes channel list pane 501, thread summary communication pane 503 and thread communication pane 505. The channel list pane 500 includes the group-based communication channels that the client device associated with the user is authorized to view. The thread summary communication pane 503 displays a summary of various group-based communication channels that the client device associated with the user is authorized to display. For example, FIG. 5 illustrates a summary of the message communications in the "announcements" group-based communication channel and the "things-to-know" group-based communication channel. The thread communication pane 505 includes message communications from a particular group-based communication channel that is indicated in channel list pane 501. In some embodiments, the thread communication pane displays the latest message communications in a particular group-based communication channel. In other embodiments, the thread communication pane may comprise a list of group-based communication channels returned as results for a search query. For example a client device may search "@John" and in the "announcements" group-based communication channel. In such an instance, the results of the search may be displayed in the thread communication pane. In order to search for John, the client device 101B transmits a mention recipient identifier of "John" to the group-based communication server 106. The group-based communication server 106 then determines one or more entries in the identifier database 107 that have the preferred or full name value John and returns the one or more entries to the client device 101B. Once the client device 101B responds with an indication as to which of the one of more entries is the correct John (as will be explained below) the group-based communication server 106 may query the group-based communication repository 107 for stored message communications associated with the group-based communication channel that are associated with John and return the resulting message communications to the client device 101B for display.

A user may provide a message communication and a mention recipient identifier to the thread summary communication pane 503 and/or the thread communication pane 505. For example, boxes in FIG. 5 display "send a reply" where a user may enter a message communication and/or a mention recipient identifier. In some embodiments, the user may only enter a mention recipient identifier (such as when a user wants to perform a search). In other embodiments, the user may enter a message communication with a mention recipient identifier (such as when a user wishes to mention/tag another user with a message communication). Returning to FIG. 4, after the client device 101B receives the message communication and/or mention recipient identifier process 400 moves to step 409.

At step 409, the client device 101B transmits, to the group-based communication server 106, a message association request comprising a mention recipient identifier and a group-based communication channel identifier. In some embodiments the message association request is associated with a message communication. In other words, the client device 101B receives a message communication and a request to tag a user to (i.e., associate the user with) the message communication. For example a user may input "Hey @James what are you doing tonight." The "Hey what are you doing tonight" part of the input is the message communication while the "James" is the mention recipient identifier (@ symbolizes a mention and is not included in the identifier.) However, in order to associate a user with a message communication, a user's global identifier must be retrieved. In embodiments, group-based communication server 106 may not be able to identify a single global identifier based on the received mention recipient identifier. This may happen when the mention recipient identifier contains a display name value that is shared by many users (e.g. Sam). By using the mention recipient identifier and the group-based communication channel identifier, the group-based communication server 106 is able to determine the correct global identifier associated with the mention recipient identifier.

The mention recipient identifier is received by the client device via input from a user (e.g. touch screen, keyboard, and the like.) The group-based channel identifier is generated by the client device 101B based on the user selected group-based communication channel. For example, with reference to FIG. 5, thread communication pane 505 displays message communication from the "announcements" group-based communication channel. The "announcements" group-based communication channel was selected from the group of available group-based communication channels as shown in channel list pane 501. In embodiments, a user enters a mention recipient identifier into the box labeled "Send a reply" in thread communication pane 505. Before transmitting the mention recipient identifier to the group-based communication server 106; the client device 101B generates a group-based communication channel identifier for the "announcements" group-based communication channel and transmits the group-based communication channel identifier along with the mention recipient identifier to the group-based communication server 106.

The client device 101B has the opportunity to transmit the mention recipient identifier and the group-based communication channel identifier after each character of the mention recipient is received. For example if the client device received "@John" (@ symbolizes a mention so it is not included in the identifier), the client device transmits a "J" character to the group-based communication server 106 whenever it is received along with the group-based communication channel identifier for the "announcements" group-based communication channel. Then when the entry of "o" is received by the client device 101B, the client device transmits the "o" character to the group-based communication server 106 along with the group-based communication channel identifier for the "announcements" group-based communication channel. This process is repeated until all of the received characters are transmitted to the group-based communication server 106.

In embodiments, during a set time period from when a first character is entered for the mention recipient identifier, if another character is not entered for the mention recipient identifier the client device 101B transmits to the group-based communication server 106 all of the received characters of the mention recipient identifier. For example the client device 101B first receives the character "@", which indicates to the client device that subsequent characters in the same text box are for a mention recipient identifier. Next, the client device 101B receives character "J" followed within 1 second by "o" followed within 1 second by "h" then 5 seconds elapses (the set time period). After the time period elapses the client device 101B transmits the text "Joh" with the group-based communication channel identifier for the "announcements" group-based communication channel to the group-based communication server 106. The time period may be any reasonable time period such as 3, 5, 7 seconds. Once the client device 101B has transmitted the message association request then process 400 moves to step 411.

At step 411, the group-based communication server 106 determines access control parameters for the group-based communication channel identified by the group-based communication channel identifier. The group-based communication server 106, using the group-based communication channel identifier, locates the data structure associated with the group-based communication channel in the group-based communication repository 107. Once located, the group-based communication server 106 retrieves the channel settings of the identified group-based communication channel and determines access control parameters of that group-based communication channel. For example, the client device 101B transmits to the group-based communication server a group-based communication channel identifier indicating a "security-mobile" group-to-group type group-based communication channel. The retrieved access control parameters may indicate a whitelist for access to the group-based communication channel by client devices associated with user profiles having associated therewith a group identifier for either the security group or the mobile group.

At step 413, the group-based communication server 106 determines, based on the access control parameters of the group-based communication channel, an authorized user identifier list that indicates which users in the group-based communication system are authorized to access the identified group-based communication channel. The authorized user identifier list is determined by the group-based communication server 106 by querying the identifier database of the group-based communication repository 107 to determine which users, based on their stored identifiers, in the identifier database 107 are authorized to access the group-based communication channel. For example if the group-based communication channel is a "security-mobile" group-to-group type group-based communication channel then the authorized user identifier list may include all user entries from the identifier database 107 that have associated therewith a group identifier for the security group and/or the mobile group. A user entry may take the form as shown in database table 300. With brief reference to FIG. 3B, a user entry for Mary James may include her corresponding global identifier, full name value, display name value, group identifier(s) (security and mobile), user title value (if available) and any other detailed identity information. Each entry into the authorized user identifier list is a potential entry. After the group-based communication server 106 determines the authorized user identifier list then at step 415 the group-based communication server 106 determines a candidate user list.

Step 415, the group-based communication server 106 generates a candidate user list based on a comparison between the received mention recipient identifier and the authorized user identifier list. Step 415 is illustrated in greater detail in FIG. 6. FIG. 6 illustrates exemplary process 600A for generating candidate user list. At step 601, the group-based communication server 106 parses the received mention recipient identifier into characters. As detailed in previous sections, the mention recipient identifier is received as a full name value or a display name value in order to keep a user of a client device 101B from having to remember another user's username (which is often a combination of letters and numbers). By using full names or display names for mentions, the group-based communication system allows users to refer to another user of the group-based communication system as they would refer to that user in real life.

At step 603, for each potential entry in the authorized user identifier list the group-based communication server 106 parses the full name value into one or more characters. At step 605, for each potential entry in the authorized user identifier list the group-based communication server 106 parses the display name value into one or more characters. Because the mention recipient identifier may correspond to a full name value or a display name value, the group-based communication server 106 must compare the mention recipient identifier to both the full name value and display name value.

At step 607, the group-based communication server 106 performs a Boolean compare operation between the one or more characters in the mention recipient identifier and the full name value of each potential entry in the authorized user identifier list. The Boolean compare operation maybe an equals operation. Thus unless the two characters are the same value/letter/symbol then the equals operation will return false. For example, "a"="b" would return a false, whereas 1=1 would return a true.

At step 611, the group-based communication server 106 adds entries to the candidate user list if the entry returns a Boolean value of true for at least an accuracy threshold percentage of Boolean comparisons. The accuracy threshold percentage may be a reasonable value such as 100% (absolute match), 90% (mostly matching), 80%, 70%, 60%, 50%, 40% and the like. The super administrator may establish the desired percentages keeping in mind a lesser percentage for matching will add more entries to the candidate user list. Furthermore, having a lower accuracy threshold percentage allows for typographical errors. In the following example, it is assumed that the mention recipient identifier is "Bobby" and the full name value is "Robby Jones." The following table will show full Boolean compare operation.

TABLE 1

| Iteration | Mention Recipient Identifier | Full Name Value | Result |
| --- | --- | --- | --- |
| 1 | B | R | False |
| 2 | O | O | True |
| 3 | B | B | True |
| 4 | B | B | True |
| 5 | Y | Y | True |
| 6 | | | False |
| 7 | | J | False |
| 8 | | O | False |
| 9 | | N | False |
| 10 | | E | False |
| 11 | | S | False |

The example comparison only yielded an accuracy percent of 36.36. Assuming the accuracy threshold percent is 80, the entry containing the full name "Robby Jones" would not be added to the candidate list. It is important to note that the first name in the full name value had an 80% accuracy rating and in some embodiments the full name may be parsed into a first and last name and an entry may be added to the candidate least if at least the first or last name is at or above the accuracy threshold percent. Staying with the previous example, the super administrator decides that the accuracy threshold percent should be 80% for first name or last name of the full name value. In this situation the entry containing the full name "Robby Jones" would be added to the candidate list. When an entry is added to the candidate list, the global identifier, full name value and display name for the corresponding user is added to the entry. For example, the entry with the full name of "Robby Jones" would include not only the full name value, but also the display name value of "Robby" and a corresponding global identifier. In other embodiments, the entry may also include additional detailed identifying information such as an avatar of Robby Jones.

At step 613, the group-based communication server 106 performs a Boolean compare operation between the one or more characters in the mention recipient identifier and the display name value of each potential entry in the authorized user identifier list. The Boolean compare operation maybe an equals operation.

At step 617, the group-based communication server 106 adds entries to the candidate user list if an entry returns a Boolean value of true for at least an accuracy threshold percentage of Boolean comparisons. In the following example, it is assumed that the mention recipient identifier is "Bobby" and the display name value is "Robby" The following table will show full Boolean compare operation.

TABLE 2

| Iteration | Mention Recipient Identifier | Display name Value | Result |
|---|---|---|---|
| 1 | B | R | False |
| 2 | O | O | True |
| 3 | B | B | True |
| 4 | B | B | True |
| 5 | Y | Y | True |

The comparison yielded an accuracy percent of 80. Assuming the accuracy threshold percent is 80, the entry containing the display name "Robby" would be added to the candidate list. An entry in the candidate user list will include at least a corresponding global identifier full name value, and display name value. In other embodiments, the entry may also include other detailed identifying information such as user title or a user avatar.

By comparing the received mention recipient identifier to both the full name value and the display name value, the user of the client device 101B may refer to the same person using either name, which increases the ease of use of the system and allows easy visual identification of who a mention is referring to. Although not shown in FIG. 6 or 3B the group-based communication server 106 may store in the identifier database 107 one or more common misspellings of a user's full name value and/or display name value. For example if a user has a display name value of "Jon" the group-based communication server 106 may store in Jon's display name value common misspellings such as "John." In this scenario even if a mention recipient identifier is "John" Jon's information may be added to a candidate user list. Once the candidate user list has been established process 400 moves to step 417.

At step 417, the group-based communication server 106 determines if the candidate user list has one entry, multiple entries or no entries. Process 400 will vary depending on the number of entries in the candidate user list. Each scenario may be independent of each other and each will be described below.

Multiple Entries in the Candidate User List

When the candidate user list has multiple entries, which of the multiple entries in the candidate user list is the desired user must be determined. As previously described, the group-based communication system allows users to mention each other as they would in a real life corporate setting (e.g. by display name). Thus, as companies grow it is likely that multiple people may have the same display name or even full name. The process described below enables a group-based communication server to differentiate between users who have the same preferred or full name and as a result allows users to be mentioned by the same name. This results in the user of a client device visually seeing a mention as a full name or display name but the group-based communication system uniquely identifying the same user via a corresponding global identifier.

First, turning to FIG. 7. Process 700 starts at 701 where the group-based communication server 106 retrieves multiple global identifiers associated with the multiple entries in the candidate user list. As previously described, an entry in the candidate user list includes at least a corresponding global identifier, a full name value, and display name value. Thus, by referencing the candidate list the group-based communication server 106 is able to retrieve the global identifiers of each entry in the candidate user list.

At step 703, the group-based communication server 106 determines detailed identifying information associated with each of the global identifiers. In some embodiments, the detailed identifying information may only include a full name value, a display name value, and a user avatar. In such an embodiment, the group-based communication server 106 may refer to the candidate user list to determine detailed identifying information associated with each global identifier. In other embodiments, one or more pieces of detailed identifying information may not be present in the candidate user list. In such an embodiment, the group-based communication server 106 may query the identifier database within the group-based communication repository 107 using a user's global identifier to retrieve additional detailed identifying information.

At step 705, the group-based communication server 106 transmits to the client device 101B the detailed identifying information for each global identifier. In some embodiments, the group-based communication server 106 may transmit for each entry in the candidate user list a global identifier, full name value, display name value, and the user avatar to client device 101B. In such an embodiment, the full name value, display name value, and the user avatar are the detailed identifying information. The information sent to the client device 101B may be in the form of a data array for rendering on the client device 101B display. Once the information has been transmitted to the client device 101B the process moves to step 419.

Now with reference to FIG. 4, at step 419, the client device 101B receives the global identifier and detailed identifying information associated with the global identifier. In one embodiment, the detailed identifying information comprises the full name value, the display name value, and the user avatar for each entry in the candidate user list. FIG. 8 illustrates an exemplary GUI 800 displayed by the client device 101B at step 419. GUI 800 illustrates a view of thread summary communication pane 801. The thread summary communication pane 801 contains message communications in the "announcements" and the "things-to-know" group-based communication channels. As a result of transmitting the mention recipient request "julie" as indicated in box 803, GUI 800 is displaying a summary array based on the received global identifier, full name value, display name value, and user avatar of each entry in the candidate user list. The summary array may take all or part of the received detailed identifying information and render it for display in the GUI 800 in close proximity to the mention recipient identifier. Close proximity means that the summary array is close enough to the mention recipient to visually indicate that the summary array corresponds to the mention recipient identifier. This proximity may be aided by the use of an arrow (as shown in FIG. 8). In GUI 800, summary array 805 is in close proximity to the "julie" mention recipient identifier in box 803 as opposed to the "julie" mention recipient in box 807. Thus it is visually clear to the user that summary array 805 corresponds to the mention recipient identifier in box 803.

As shown in GUI 800, summary array 805 displays the full name, the display name, and user avatar of Julie Mann and Julie Jones. Both of these Julies were in the candidate user list as a result of the mention recipient identifier "julie" and the group-based communication channel identifier indicating the "things-to-know" group-based communication channel. Although only shown with two entries, summary array 805 is capable of displaying a plurality of entries. In addition, the summary array may contain additional detailed identifying information such as a user title. The information displayed in summary array is intended to aid in uniquely identifying a user without showing the user's global identifier. After displaying the summary array the client device 101B receives a selection of a single entry from the summary array. For example, the client device 101B may receive a selection of Julie Mann from the user of the client device. Once the client device 101B receives a selection of one entry from the summary array process 400 moves to step 421.

At step 421, the client device 101B transmits, to the group-based communication server 106, the selection one of the received detailed identifying information which corresponds to a single entry in the candidate user list. In one embodiment, the client device 101B, having previously received the global identifier for each entry may simply, upon a selection, transmit the global identifier of the selected entry to the group-based communication server 106. With reference to FIG. 8, if the client device 101B receives a selection for "Julie Mann" then the client device 101B simply transmits the global identifier that corresponds to "Julie Mann." In some embodiments, although the user of the client device 101B may never have awareness of the global identifiers for users, the client device 101B has awareness of the global identifier for each displayed user in the summary array. Thus when a user of the client device 101B selects a user based on the displayed detailed identifying information the client device 101B will recognize the global identifier that corresponds to the selected detailed identifying information. In another embodiment, the client device 101B may transmit the user avatar (or some other piece or combination of detailed identifying information) of the selected entry to the group-based communication server 106, and the group-based communication server 106 will compare the selected avatar to every avatar in the candidate list to determine the global identifier of the selected user avatar.

In addition, also at step 421, the client device 101B transmits the message communication that is associated with the mention recipient identifier upon having established which entry from the candidate user list corresponds to the desired mention recipient identifier. With reference to FIG. 8, the client device 101B may transmit the message communication "Looks like @julie has some competition" along with Julie Mann's global identifier or Julie Mann's avatar to the group-based communication server 106. Once client device 101B transmits the selection of an entry that corresponds to an entry in the candidate user list process 400 moves to step 423.

Step 423 is explained in greater detail with reference to FIG. 7. At 707, the group-based communication server 106 receives, from the client device 101B, a selection of one or more of the detailed information. In one embodiment, the client device transmits the global identifier associated with the selected detailed identifying information. In such an embodiment, at step 709, the group-based communication server 106 determines the corresponding global identifier by analyzing the received communication from the client device 101B (since it includes the corresponding global identifier). However, in embodiments where the client device 101B does not transmit the global identifier for the selection, then at step 709, the group-based communication server 106 determines the global identifier from the selected detailed identifying information. The selection of detailed identifying information may include a full name value, a display name value, user title, a user avatar or any other piece of detailed identifying information. In one embodiment, using the candidate user list the group-based communication server 106 may compare received detailed identifying information with detailed identifying information in each entry of the candidate user list. For example, instead of transmitting Julie Mann's global identifier, the client device may simply transmit Julie Mann's full name value of "Julie Mann." The group-based communication server 106, having knowledge of user identifiers that have been transmitted to the client device 101B at step 419 may simply compare the full name value of Julie Mann to all the entries on the candidate user list and then obtain Julie Mann's global identifier based on which ever entry has the full name value of "Julie Mann."

This process may be performed using any piece or combination of detailed identifying information. It may be more secure for the client device 101B to transmit a part of the detailed identifying information instead of a global identifier to avoid the communication being intercepted by an unwanted user. Because all mentions are stored within the group-based communication repository 107 with a user's global identifier (as opposed to a full name value or display name value), compromising a user's global identifier may be harmful to the system. Thus, it may be preferable to transmit a display name value, full name or other piece of detailed identifying information instead of the global identifier.

At step 711, once the global identifier has been identified, the group-based communication server 101B associates the received message communication with the identified global identifier in the group-based communication repository 107.

Once a global identifier is associated with a message communication, a client device 101B may easily search for all communication related to a particular user by using his or her full name value or preferred value as a mention recipient identifier. In other embodiments, when a user has been tagged in a message communication the user may automatically be notified of and/or receive the message communication.

A Single Entry in the Candidate User List

At step 417, when the candidate user list has a single entry, the global identifier of the entry may be easily determined, because there is only a single possible global identifier in the candidate user list. The following description will make reference to FIGS. 9 and 10. First turning to FIG. 9, at step 901, the group-based communication server 106 retrieves the global identifier associated with the single entry in the candidate user list and then at step 903, the group-based communication server 106 transmits the global identifier and detailed identifying information for the single entry to the candidate list. The detailed identifying information may include a full name value, a display name value, and a user avatar.

Returning now to FIG. 4, at step 419, the client device 101B receives the global identifier and detailed identifying information from the group-based communication server 106. FIG. 10 shows an exemplary GUI 1000 displayed by the client device 101B at step 419. GUI 1000 shows a view of thread summary communication pane 1001. The thread summary communication pane 1001 contains message communications in the "announcements" and the "things-to-know" group-based communication channels. GUI 1000 displays summary array 1005 based on the received global identifier and detailed identifying information corresponding to the single entry in the candidate list. The summary array may take all or part of the received detailed identifying information and display it in the GUI in close proximity to the mention recipient identifier. Close proximity means that the summary array is close enough to the mention recipient to visually show that the summary array corresponds to the mention recipient. This proximity may be aided by the use of an arrow (as shown in FIG. 10.).

In GUI 1000, summary array 805 is in close proximity to the "julie" mention recipient identifier in box 1003 as opposed to the "julie" mention recipient in box 1007. Thus, it is visually clear to the user that summary array 1005 corresponds to the mention recipient identifier in box 1003. As shown in GUI 1000, summary array 1005 is displaying detailed identifying information (e.g. the full name, the display name, and user avatar) of Julie Jones. Julie Jones was the only entry in the candidate user list as a result of the mention recipient identifier "julie" and the group-based channel identifier indicating the "things-to-know" group-based communication channel. As can be seen in FIG. 10, the summary array 1005 may be overlaid on top of thread summary communication pane 1001. After displaying the summary array the client device receives a confirmation input from the user to verify that the entry in summary array 1005 is the correct user and process 400 moves to step 421.

At step 421, the client device 101B transmits, to the group-based communication server 106, confirmation of the single entry in the candidate user list and an associated message communication. In one embodiment, the client device 101B, having previously received the global identifier for the single entry may, upon confirmation, transmit the global identifier of the single entry back to the group-based communication server 106. With reference to FIG. 10, if the client device 101B receives confirmation for "Julie Jones" then the client device 101B transmits the global identifier that corresponds to "Julie Jones." In another embodiment, the client device 101B may transmit the full name value (or some other piece or combination of detailed identifying information) of the single entry to the group-based communication server 106. The group-based communication server 106 will then compare the received piece of detailed identifying data to the detailed identifying data of the single entry in the candidate user list for confirmation. At this step the client device 101B transmits whatever message communication is associated with the mention recipient identifier since the desired mention recipient identifier has been confirmed. The client device 101B may transmit the message communication "Looks like @julie has some competition" along with Julie Jones's global identifier or Julie Jones's avatar. Once client device 101B transmits the selection of an entry that corresponds to an entry in the candidate user list process 400 moves to step 423.

Step 423 is explained in greater detail with reference to FIG. 9. At 905. At 905, the group-based communication server 106 receives, from the client device 101B, confirmation that the detailed identifying information corresponds to the single entry in the candidate user list. In one embodiment, the client device transmits the global identifier associated single entry in the candidate user list as confirmation. In other embodiment, the client device 101B confirmation contains on or more pieces of detailed identifying information. The detailed identifying information may be a full name value, a display name value, user title, a user avatar or any combination of listed items. The group-based communication server 106 may compare received detailed identifying information with detailed identifying information in the single entry of the candidate user list. For example, instead of transmitting Julie Jones's global identifier, the client device 101B may simply send Julie Jones's full name value of "Julie Jones." The group-based communication server 106, having record of the candidate user list sent to the client device 101B at step 419, may simply compare the full name value of Julie Jones to the single entry in the candidate user list and then obtain Julie Jones's global identifier if the full name values match.

This process may be performed using any piece or combination of detailed identifying information. It may be more secure for the client device 101B to transmit detailed identifying information as opposed to a global identifier of a user as to avoid the global identifier being intercepted by an unwanted user.

At step 907, the group-based communication server 106 associates the received message communication with the global identifier and stores the message communication in the group-based communication repository 107.

In some embodiments, where there exists only a single entry in the candidate user list, steps 419 and 421 may be omitted. In such an instance, instead of transmitting detailed identifying information to the client device 101B for confirmation, the group-based communication server 106 can indicate to the client device 101B that there is a single entry in the candidate user list and request that the client device 101B transmit the associated message communication. Once the message communication is received, the group-based communication sever 106 associates the message communication with the global identifier in the group-based communication repository 107.

After a message communication has been successfully tagged, via the association process describe herein, the client device 101B may query the group-based communication server 106 to display a summary array that identifies the tagged user.

As described previously, people in the same group-based communication channel may have the same display name or full name value, thus to if he sees "@julie" (and there are multiple people with the display name Julie) the user may not know to which Julie "@julie" refers to. A user may mouse-over, select, tap the mention recipient identifier and the client device will display in the GUI a summary array that includes a full name value, display name value, and/or other detailed identifying information. For example, with reference to FIG. 10, box 1003 now contains a message communication that has already been successfully tagged to Julie Jones. However, the tag only displays Julie's display name, and there are other Julies in the group-based communication channel (e.g. see FIG. 8). As a result, it is possible that the "julie" mention recipient identifier may refer to multiple people. The client device 101B receives a touch input on its display where the GUI is displaying "@julie" and as a result a summary array is populated with detailed identifying information. The user of the client device 101B is then able to determine which Julie the @julie refers to.

No Entries in the Candidate User List

In the situation where there are no entries in the candidate user list process 400 stops at 417 and an alternate process is performed to remedy the problem. Such a process is described in FIG. 11.

FIG. 11 illustrates exemplary process 1100 for instances where there are no entries in the candidate user list. At step 1101, the group-based communication server 106 determines if the received mention recipient identifier exists outside of the authorized user identifier list. For example, the mention recipient identifier may refer to a valid user in the organization, but the user is not allowed access to the particular channel the mention recipient identifier was entered into. In such a case then at step 1103, the group-based communication server 106 transmits the client device 101B a confirmation message that may include the global identifier, full name value, display name value, and other detailed identifying information associated with the mention recipient identifier.

Once received the user of the client device 101B may confirm that the received information corresponds to the intended recipient. At step 1105, the group-based communication server 106 receives confirmation from the client device 101B and determines if the confirmation is true or false. If the confirmation is false, then at step 1107, the group-based communication server 106 transmits the client device 101B an error message and requests another submission of a mention recipient identifier. If the confirmation is true, then at step 1109, the group-based communication server 106 identifies a global identifier associated with the mention identifier and transmits a request for channel access for the retrieved global identifier to a client device 101B of a group administrator or super administrator. The group-based communication server 106 may obtain the global identifier of the user after a positive confirmation by any of the means described previously. The subsequent request for channel access may be approved or denied by the group administrator or the super administrator.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A group-based communication system for processing message association requests, the group-based communication system comprising at least one processor and at least one memory including computer program code, wherein the at least one memory and the computer program code are configured to, with the at least one processor, cause the group-based communication system to:
  receive a user input from a client device within a group-based communication channel of the group-based communication system, wherein access to the group-based communication channel is restricted to users with validated requests or accepted invitations to join the group-based communication channel;
  determine that the user input comprises a message association request embedded in a message communication based at least in part on a mention symbol that precedes a mention recipient identifier within the user input;
  determine access control parameters for the group-based communication channel in which the group-based communication system received the user input, wherein the access control parameters indicate global identifiers associated with users that are authorized to access the group-based communication channel, and wherein the global identifiers comprise 64 bit unsigned integers that uniquely identify the authorized users within the group-based communication system;
  retrieve identifying information for the authorized users based at least in part on using the global identifiers to query a group-based communication repository within the group-based communication system, the identifying information comprising respective display name strings and full name strings stored in association with the 64 bit unsigned integers that uniquely identify the authorized users within the group-based communication system;
  perform a plurality of Boolean comparisons between the mention recipient identifier and one or more of the display name strings or the full name strings associated with the authorized users, wherein, to perform the plurality of Boolean comparisons, the at least one memory and the computer program code are configured to, with the at least one processor, cause the group-based communication system to:
    perform a first plurality of Boolean comparisons between each character in the mention recipient identifier and each character in the display name strings; and
    perform a second plurality of Boolean comparisons between each character in the mention recipient identifier and each character in the full name strings;
  add two or more of the authorized users to a candidate user list based at least in part on the first plurality of Boolean comparisons or the second plurality of Boolean comparisons satisfying an accuracy threshold percentage for the two or more authorized users, wherein the accuracy threshold percentage is greater than 0 and less than 100;
  transmit an indication of the identifying information for the two or more authorized users on the candidate user list to the client device within the group-based communication channel;
  receive, from the client device, a selection of a user from the two or more authorized users on the candidate user list;
  associate the message communication with a 64 bit unsigned integer that uniquely identifies the selected user within the group-based communication system;
  post the message communication in the group-based communication channel; and
  transmit, to a device associated with the 64 bit unsigned integer that uniquely identifies the selected user within the group-based communication system, a notification that the selected user was mentioned in the group-based communication channel.

2. The group-based communication system of claim 1, wherein the mention recipient identifier includes a full name string or a display name string associated with the selected user.

3. The group-based communication system of claim 1, wherein the identifying information comprises the full name strings, the display name strings, user title values, and avatar representations of the authorized users.

4. The group-based communication system of claim 1, wherein the mention recipient identifier comprises one or more non-ASCII characters.

5. The group-based communication system of claim 1, wherein the at least one memory and the computer program code are further configured to, with the at least one processor, cause the group-based communication system to:
  generate an authorized user list that comprises a plurality of potential entries associated with the authorized users, wherein each of the plurality of potential entries comprises a global identifier, a full name string, and a display name string associated with one of the authorized users.

6. The group-based communication system of claim 5, wherein, to perform the plurality of Boolean comparisons, the at least one memory and the computer program code are configured to, with the at least one processor, cause the group-based communication system to:
Boolean compare one or more characters in the mention recipient identifier to the full name string of each potential entry in the authorized user list; and
add, to the candidate user list, potential entries that return a threshold percentage of Boolean results with a value of true, wherein the threshold percentage is greater than 0.

7. The group-based communication system of claim 6, wherein, to perform the plurality of Boolean comparisons, the at least one memory and the computer program code are configured to, with the at least one processor, cause the group-based communication system to:
Boolean compare each subsequent character in the mention recipient identifier to the full name string of each potential entry in the authorized user list; and
add, to the candidate user list, potential entries that return a threshold percentage of Boolean results with a value of true, wherein the threshold percentage is greater than 0.

8. The group-based communication system of claim 6, wherein, to perform the plurality of Boolean comparisons, the at least one memory and the computer program code are configured to, with the at least one processor, cause the group-based communication system to:
Boolean compare each subsequent character in the mention recipient identifier to the full name string of each potential entry in the authorized user list; and
add, to the candidate user list, potential entries that return a threshold percentage of Boolean results with a value of true, wherein the threshold percentage is greater than 80.

9. The group-based communication system of claim 8, wherein the threshold percentage is 100.

10. The group-based communication system of claim 5, wherein, to perform the plurality of Boolean comparisons, the at least one memory and the computer program code are configured to, with the at least one processor, cause the group-based communication system to:
Boolean compare one or more characters in the mention recipient identifier to the display name string of each potential entry in the authorized user list; and
add, to the candidate user list, potential entries that return a threshold percentage of Boolean results with a value of true, wherein the threshold percentage is greater than 0.

11. The group-based communication system of claim 10, wherein, to perform the plurality of Boolean comparisons, the at least one memory and the computer program code are configured to, with the at least one processor, cause the group-based communication system to:
Boolean compare each subsequent character in the mention recipient identifier to the display name string of each potential entry in the authorized user list; and
add, to the candidate user list, potential entries that return a threshold percentage of Boolean results with a value of true, wherein the threshold percentage is greater than 0.

12. The group-based communication system of claim 10, wherein, to perform the plurality of Boolean comparisons, the at least one memory and the computer program code are configured to, with the at least one processor, cause the group-based communication system to:
Boolean compare each subsequent character in the mention recipient identifier to the display name string of each potential entry in the authorized user list; and
add, to the candidate user list, potential entries that return a threshold percentage of Boolean results with a value of true, wherein the threshold percentage is greater than 80.

13. The group-based communication system of claim 12, wherein the threshold percentage is 100.

14. A method for processing message association requests in a group-based communication system, comprising:
receiving a user input from a client device within a group-based communication channel of the group-based communication system, wherein access to the group-based communication channel is restricted to users with validated requests or accepted invitations to join the group-based communication channel;
determining that the user input comprises a message association request embedded in a message communication based at least in part on a mention symbol that precedes a mention recipient identifier within the user input;
determining access control parameters for the group-based communication channel in which the group-based communication system received the user input, wherein the access control parameters indicate global identifiers associated with users that are authorized to access the group-based communication channel, and wherein the global identifiers comprise 64 bit unsigned integers that uniquely identify the authorized users within the group-based communication system;
retrieving identifying information for the authorized users based at least in part on using the global identifiers to query a group-based communication repository within the group-based communication system, the identifying information comprising respective display name strings and full name strings stored in association with the 64 bit unsigned integers that uniquely identify the authorized users within the group-based communication system;
performing a plurality of Boolean comparisons between the mention recipient identifier and one or more of the display name strings or the full name strings associated with the authorized users, wherein performing the plurality of Boolean comparisons comprises:
performing a first plurality of Boolean comparisons between each character in the mention recipient identifier and each character in the display name strings; and
performing a second plurality of Boolean comparisons between each character in the mention recipient identifier and each character in the full name strings;
adding two or more of the authorized users to a candidate user list based at least in part on the first plurality of Boolean comparisons or the second plurality of Boolean comparisons satisfying an accuracy threshold percentage for the two or more authorized users, wherein the accuracy threshold percentage is greater than 0 and less than 100;

transmitting an indication of the identifying information for the two or more authorized users on the candidate user list to the client device within the group-based communication channel;

receiving, from the client device, a selection of a user from the two or more authorized users on the candidate user list;

associating the message communication with a 64 bit unsigned integer that uniquely identifies the selected user within the group-based communication system;

posting the message communication in the group-based communication channel; and transmitting, to a device associated with the 64 bit unsigned integer that uniquely identifies the selected user within the group-based communication system, a notification that the selected user was mentioned in the group-based communication channel.

15. The method of claim 14, wherein the mention recipient identifier includes a full name string or a display name string associated with the selected user.

16. The method of claim 14, wherein the identifying information comprises the full name strings, the display name strings, user title values, and avatar representations of the authorized users.

17. The method of claim 14, wherein the mention recipient identifier comprises one or more non-ASCII characters.

18. The method of claim 14, wherein the global identifiers are inaccessible to users of the group-based communication system.

19. A method for processing message association requests at a group-based communication system, comprising:

receiving a user input from a client device within a group-based communication channel of the group-based communication system, wherein access to the group-based communication channel is restricted to users with validated requests or accepted invitations to join the group-based communication channel;

determining that the user input comprises a message association request embedded in a message communication based at least in part on a mention symbol that precedes a mention recipient identifier within the user input;

determining access control parameters for the group-based communication channel in which the group-based communication system received the user input, wherein the access control parameters indicate global identifiers associated with users that are authorized to access the group-based communication channel, and wherein the global identifiers comprise 64 bit unsigned integers that uniquely identify the authorized users within the group-based communication system;

retrieving identifying information for the authorized users based at least in part on using the global identifiers to query a group-based communication repository within the group-based communication system, the identifying information comprising respective display name strings and full name strings stored in association with the 64 bit unsigned integers that uniquely identify the authorized users within the group-based communication system;

performing a plurality of Boolean comparisons between the mention recipient identifier and one or more of the display name strings or the full name strings associated with the authorized users, wherein performing the plurality of Boolean comparisons comprises:

performing a first plurality of Boolean comparisons between each character in the mention recipient identifier and each character in the display name strings; and performing a second plurality of Boolean comparisons between each character in the mention recipient identifier and each character in the full name strings;

adding one or more of the authorized users to a candidate user list if the first plurality of Boolean comparisons or the second plurality of Boolean comparisons satisfy an accuracy threshold percentage for the one or more authorized users, wherein the accuracy threshold percentage is greater than 0 and less than 100; and in response to determining that there are no valid entries in the candidate user list:

querying the group-based communication repository to determine whether the mention recipient identifier exists within the group-based communication system;

retrieving, from the group-based communication repository and responsive to determining that the mention recipient identifier exists outside of the group-based communication channel, identifying information for a user associated with the mention recipient identifier;

transmitting, to the client device, an indication of the identifying information for the user associated with the mention recipient identifier; and receiving a confirmation message from the client device in response to the indication.

20. The method of claim 19, further comprising:

in response to the confirmation message indicating a positive confirmation:

transmitting, to a second client device associated with an administrator of the group-based communication system, a request to add a global identifier associated with the mention recipient identifier to a list of global identifiers that have permission to access the group-based communication channel; and receiving, from the second client device, a response that indicates an approval or denial of the request.

21. The method of claim 19, further comprising:

in response to the confirmation message indicating a negative confirmation:

transmitting, to the client device, an error message and a request to provide an updated mention recipient identifier for the message association request.

* * * * *